(12) United States Patent
Sudo

(10) Patent No.: US 7,746,762 B2
(45) Date of Patent: Jun. 29, 2010

(54) TRANSMITTING APPARATUS AND TRANSMITTING METHOD

(75) Inventor: Hiroaki Sudo, Yokohama (JP)

(73) Assignee: Panasonic Corporation, Osaka (JP)

( * ) Notice: Subject to any disclaimer, the term of this patent is extended or adjusted under 35 U.S.C. 154(b) by 818 days.

(21) Appl. No.: 10/534,987

(22) PCT Filed: Nov. 13, 2003

(86) PCT No.: PCT/JP03/14418

§ 371 (c)(1),
(2), (4) Date: May 16, 2005

(87) PCT Pub. No.: WO2004/047347

PCT Pub. Date: Jun. 3, 2004

(65) Prior Publication Data

US 2006/0062140 A1    Mar. 23, 2006

(30) Foreign Application Priority Data

Nov. 18, 2002  (JP)  ............................ 2002-333448
Dec. 6, 2002   (JP)  ............................ 2002-355079

(51) Int. Cl.
*H04J 11/00* (2006.01)
(52) U.S. Cl. ................................... 370/208
(58) Field of Classification Search .................. 370/208
See application file for complete search history.

(56) References Cited

U.S. PATENT DOCUMENTS 5,422,887 A * 6/1995 Diepstraten et al. ......... 370/448
5,504,775 A   4/1996 Chouly et al.

(Continued)

FOREIGN PATENT DOCUMENTS

EP    0 998 158    5/2000

(Continued)

OTHER PUBLICATIONS

Japanese Office Action dated Oct. 11, 2005 with English translation.

(Continued)

*Primary Examiner*—Hanh Nguyen
*Assistant Examiner*—Juvena Loo
(74) *Attorney, Agent, or Firm*—Dickinson Wright PLLC

(57) ABSTRACT

A control section 101 outputs retransmission information as to whether or not a transmit signal is a retransmission signal, and if a retransmission signal, which (first, second, etc.) retransmission this is, to a selection section 107. An IFFT section 103 performs orthogonal frequency division multiplexing processing of the transmit signal. A GI insertion section 104 inserts a guard interval in the transmit signal. A GI insertion section 105 inserts in the transmit signal a guard interval longer than the guard interval inserted by GI insertion section 104. A GI insertion section 106 inserts in the transmit signal a guard interval longer than the guard intervals inserted by GI insertion section 104 and GI insertion section 105. Based on the retransmission information input from control section 101, selection section 107 selects a transmit signal in which a longer guard interval has been inserted as the number of retransmissions increases. By this means it is possible to prevent an increase in transmission delay due to an excessive increase in the number of retransmissions with almost no lowering of transmission efficiency.

12 Claims, 30 Drawing Sheets

U.S. PATENT DOCUMENTS

| | | | |
|---|---|---|---|
| 6,091,781 | A | 7/2000 | Mujtaba |
| 6,584,092 | B1 | 6/2003 | Sudo |
| 6,628,723 | B1 * | 9/2003 | Gerlach et al. ............. 375/259 |
| 6,735,256 | B1 | 5/2004 | Toshimitsu |
| 6,885,630 | B2 * | 4/2005 | Kostic et al. ................ 370/203 |
| 7,072,307 | B2 * | 7/2006 | Tong et al. .................. 370/253 |
| 2002/0051501 | A1 * | 5/2002 | Demjanenko et al. ....... 375/298 |
| 2002/0163975 | A1 | 11/2002 | Uesugi et al. |
| 2002/0181509 | A1 * | 12/2002 | Mody et al. ................. 370/480 |
| 2002/0199147 | A1 * | 12/2002 | Kim et al. ................... 714/748 |
| 2003/0165120 | A1 | 9/2003 | Uesugi et al. |

FOREIGN PATENT DOCUMENTS

| | | |
|---|---|---|
| EP | 1 003 296 | 5/2000 |
| EP | 1 014 639 | 6/2000 |
| EP | 1014639 A2 * | 6/2000 |
| JP | 6-112922 | 4/1994 |
| JP | 6-232871 | 8/1994 |
| JP | 11-055206 | 2/1999 |
| JP | 2000/134668 | 5/2000 |
| JP | 2000/151504 | 5/2000 |
| JP | 2000 151546 | 5/2000 |
| JP | 2000 244441 | 9/2000 |
| JP | 2001 103060 | 4/2001 |
| JP | 2001 111519 | 4/2001 |
| JP | 2001 144724 | 5/2001 |
| JP | 2002 026863 | 1/2002 |
| JP | 2002 171298 | 6/2002 |
| JP | 2002 261726 | 9/2002 |
| JP | 2002 271296 | 9/2002 |
| JP | 2002 281003 | 9/2002 |
| JP | 2002 281047 | 9/2002 |
| JP | 2002 535925 | 10/2002 |
| WO | 00/44144 | 7/2000 |

OTHER PUBLICATIONS

T. Yoshiki, et al., "Performance of a Multilevel Transmit Power Control Scheme for the OFDM Subcarrier Adaptive Modulation System," Technical Report of IEICE, SSE2000-71, RCS2000-60(Jul. 2000), Osaka, Japan, pp. 63-68, Jul. 2000.

Japanese Office Action Dated Mar. 4, 2008 with English Translation.

M. Sawahashi, et al., "Kahen Kakusan Ritsu O Mochiiru Broadband TD-OFCDM Packet Denso—Broadband TD-OFCDM Packet Transmission using Variable Spreading Factor," 2001 IEICE Sogo Taikai Koen Ronbunshu, Tsushin 1, Mar. 2001, p. 495, with English translation.

European Search Report dated Oct. 9, 2008.

Futaki et al., "Low-Density Parity-Check (LDPC) Coded OFDM Systems," VTC Fall 2001, IEEE 54th, Vehicular Technology Conference, Proceedings, Atlantic City, NJ, Oct. 7-11, 2001; [IEEE Vehicular Technology Conference], New York, NY: IEEE, US, vol. 1, Oct. 7, 2001 (Oct. 10, 2007), pp. 82-86.

* cited by examiner

TRANSMITTING APPARATUS AND TRANSMITTING METHOD

TECHNICAL FIELD

The present invention relates to a transmitting apparatus and transmitting method using a multicarrier transmission method such as OFDM (Orthogonal Frequency Division Multiplexing).

BACKGROUND ART

Generally, in an OFDM transmitting/receiving apparatus, a frame configuration is used in which a signal with the same waveform as the last part of effective symbols is added as a guard interval (hereinafter referred to as "GI") at the start of effective symbols. A delayed waveform with a delay time shorter than the guard interval length can be eliminated by Fast Fourier Transformation (hereinafter referred to as "FFT") processing in the receiving system. On the other hand, if the multipath delay time is longer than the GI length, or if there is timing error, the preceding signal may leak into the effective symbols of the next signal, and inter-code interference may occur.

In the transmitting system, a signal that has undergone Inverse Fast Fourier Transform (hereinafter referred to as "IFFT") processing has a GI inserted and is converted from a digital signal to an analog signal, and a transmit signal is obtained.

In the receiving system, a received signal is converted from an analog signal to a digital signal. Then the received signal from which GIs have been eliminated by a GI elimination circuit undergoes FFT processing, and a baseband signal is obtained. The baseband signal undergoes coherent detection by means of a coherent detector, and a coherent detected signal is obtained.

Nowadays, in radio communications, and especially in mobile communications, various kinds of information such as images and data are transmitted as well as voice. Henceforth, demand for the transmission of various kinds of content is expected to continue to grow, further increasing the necessity of highly reliable, high-speed transmission. However, when high-speed transmission is carried out in mobile communications, the effect of delayed waves due to multipath propagation can no longer be ignored, and transmission characteristics degrade due to frequency selective fading.

Multicarrier (MC) modulation methods such as OFDM (Orthogonal Frequency Division Multiplexing) are attracting attention as one kind of technology for combating frequency selective fading. A multicarrier modulation method is a technology for effectively performing high-speed transmission by transmitting data using a plurality of carrier waves (subcarriers) whose speed is suppressed to a level at which frequency selective fading does not occur. With the OFDM method, in particular, the subcarriers to which data is allocated are mutually orthogonal, making this the multicarrier modulation method offering the highest spectral efficiency. Moreover, the OFDM method can be implemented with a comparatively simple hardware configuration. For these reasons, the OFDM method has attracted particular attention and is the subject of various studies.

Conventionally, received signal transmission error detection is performed, and when an error is detected, a retransmission request signal is sent to the communicating radio station. On receiving a retransmission request, the communicating radio station retransmits data corresponding to the retransmission request. This processing is then repeated until there is no longer an error in the received signal. This series of processes is called ARQ.

However, with a conventional transmitting apparatus and transmitting method, particularly when channel fluctuations are slow, errors may occur consecutively even when retransmission is performed to a specific user requesting retransmission. In this case the number of retransmissions increases excessively, and since propagation delay increases as the number of retransmissions increases, there is a problem of increased transmission delay. There is a method for preventing this increase in transmission delay by discontinuing retransmissions at a given delay time, but in this case, there is a problem of error rate degradation. Furthermore, since new data is not contained in a GI, there is also a problem of transmission efficiency decreasing as a GI is made longer.

DISCLOSURE OF INVENTION

It is an object of the present invention to provide a transmitting apparatus and transmitting method that make it possible to prevent an increase in transmission delay due to an excessive increase in the number of retransmissions.

This object is achieved by increasing the GI length in proportion as the number of retransmissions increases, or taking delay distribution information, the transmission time interval, the band used, or the like, into consideration in setting the GI length. Also, this object is achieved by increasing only the GI length for systematic bit data output by turbo coding when the number of retransmissions increases. Furthermore, this object is achieved by increasing the number of subcarriers to which the same signal is allocated in proportion as the number of retransmissions increases, or taking channel quality information, the transmission time interval, the band used, or the like, into consideration in setting the number of subcarriers to which the same signal is allocated. Moreover, this object is achieved by increasing only the number of subcarriers to which the same signal of systematic bit data output by turbo coding is allocated when the number of retransmissions increases.

BEST MODE FOR CARRYING OUT THE INVENTION

With reference now to the accompanying drawings, embodiments of the present invention will be explained in detail below.

Embodiment 1

Figure 1:
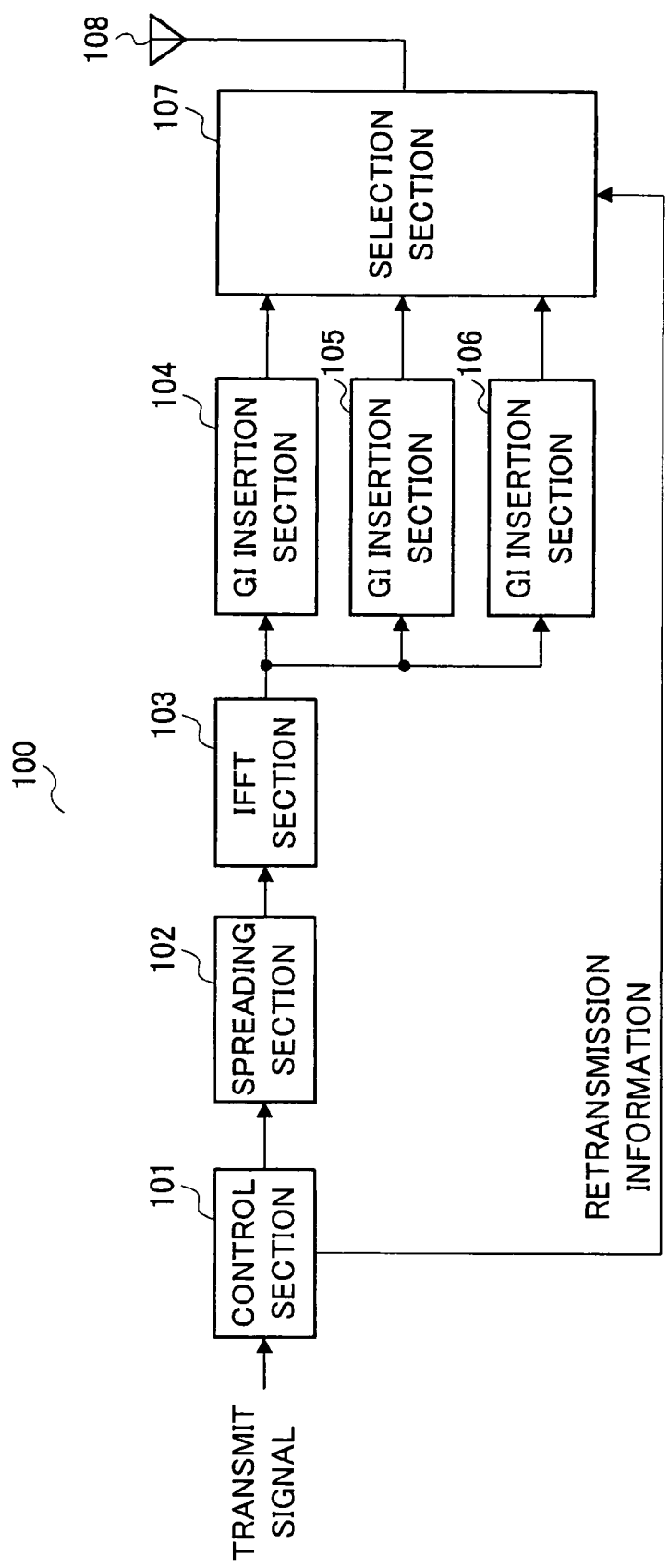
FIG. 1 is a block diagram showing the configuration of a transmitting apparatus according to Embodiment 1 of the present invention.

FIG. 1 is a block diagram showing the configuration of a transmitting apparatus according to Embodiment 1 of the present invention.

Transmitting apparatus 100 is mainly composed of a control section 101, a spreading section 102, an IFFT section 103, a GI insertion section 104, a GI insertion section 105, a GI insertion section 106, a selection section 107, and an antenna 108.

Control section 101 temporarily stores a transmit signal modulated by a modulation section (not shown), and when transmission timing is reached, outputs the transmit signal to spreading section 102. As there are two cases for a transmit signal—the case of a normal transmit signal that is not a retransmission signal, and the case of a retransmission signal—control section 101 separates transmit signals into retransmission signals and normal signals other than retransmission signals, determines the retransmission count in the case of a retransmission signal, and outputs retransmission information to selection section 107. Retransmission information includes information as to whether this is a retransmission, and information on the retransmission count.

Spreading section 102 carries out spreading processing of transmit signals input from control section 101 using different spreading codes, performs code division multiplexing, and generates a CDMA signal, which it outputs to IFFT section 103. As spreading ratio 1, spreading section 102 may output a transmit signal directly to IFFT section 103 without spreading that transmit signal. In this case, the signal subject to IFFT processing by IFFT section 103 is an OFDM signal.

Figure 2:
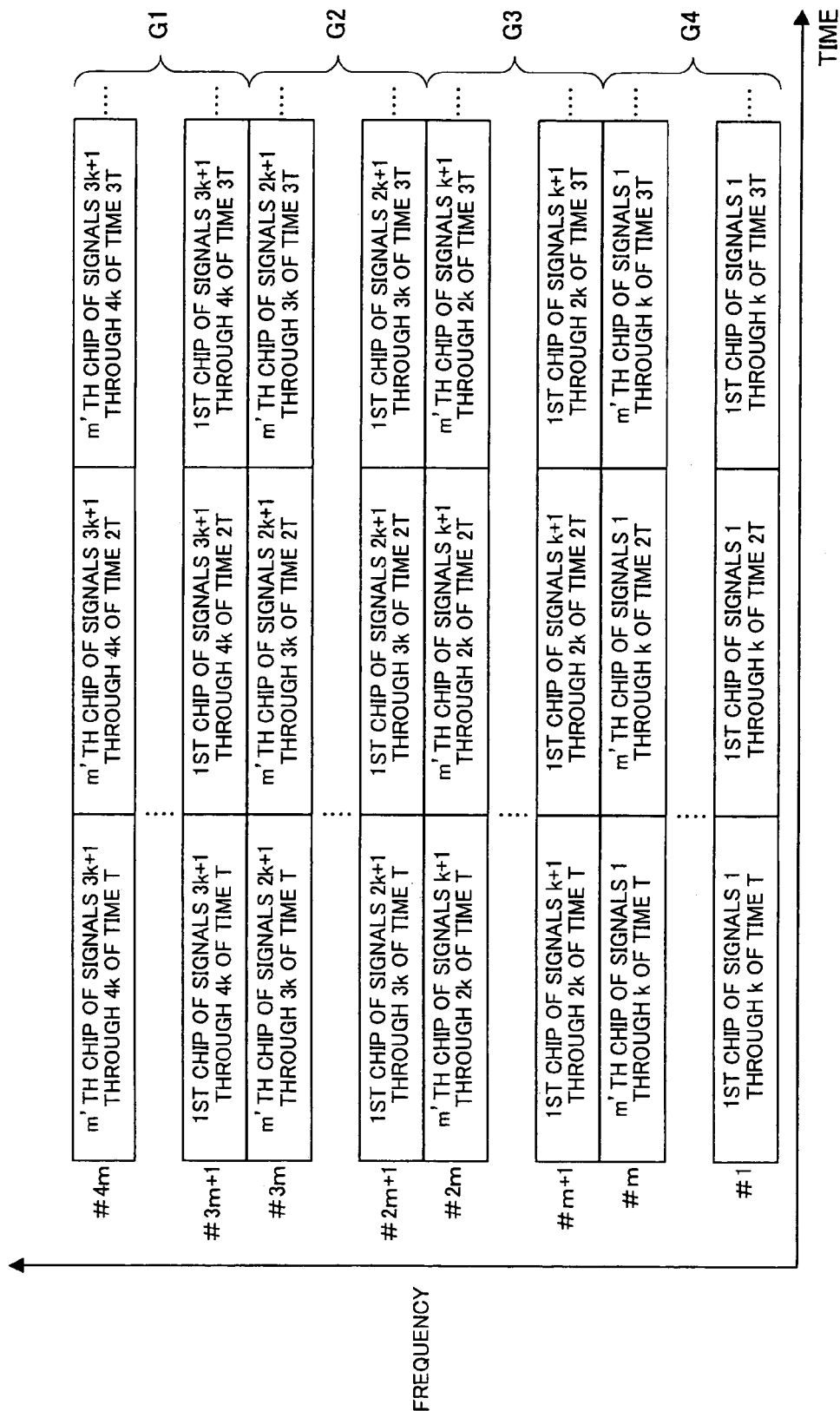
FIG. 2 is a drawing showing signal arrangement in an OFDM-CDMA communication method.
Figure 3:
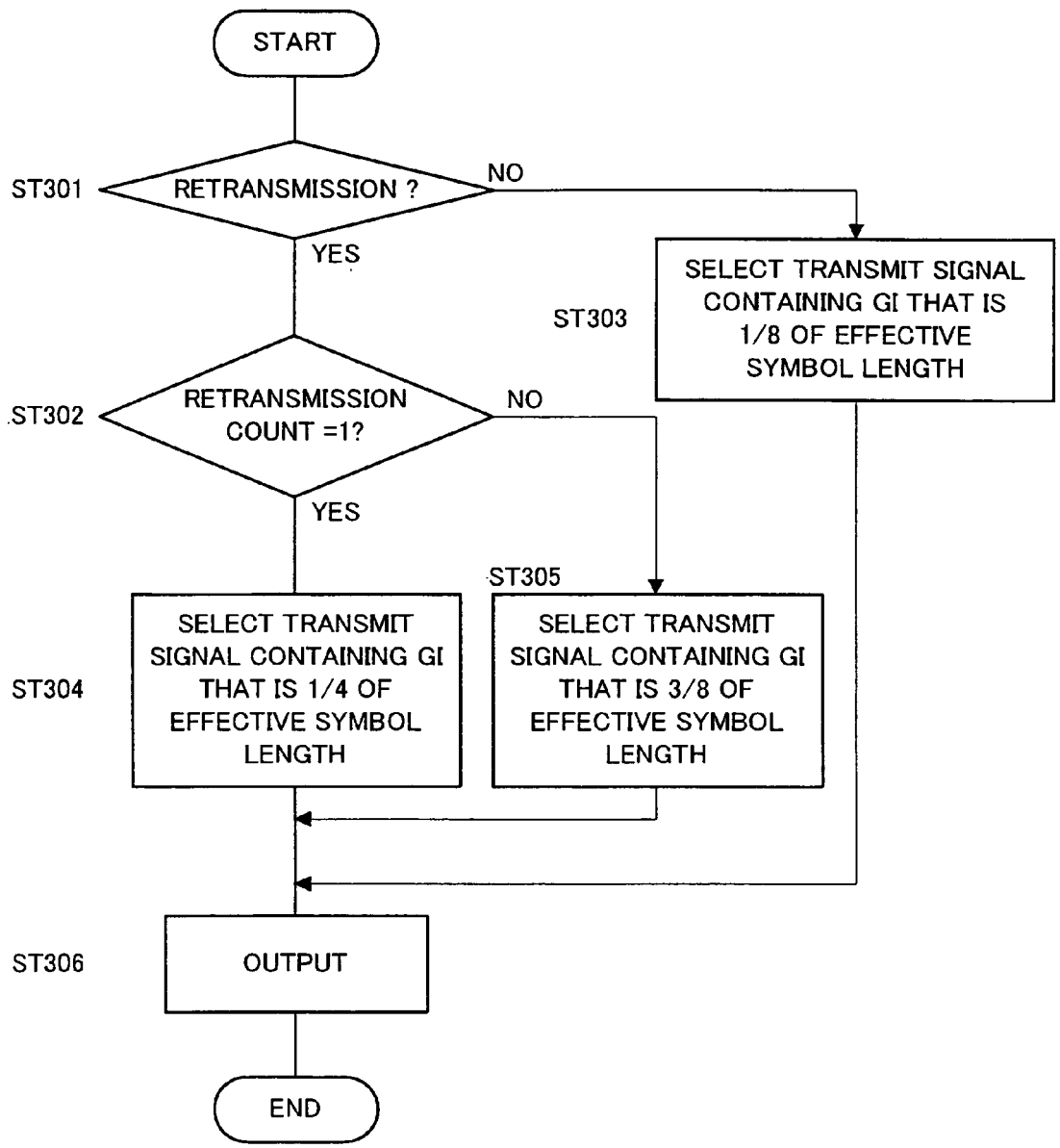
FIG. 3 is a flowchart showing the operation of a transmitting apparatus according to Embodiment 1 of the present invention.

IFFT section 103, which is an orthogonal frequency division multiplexing section, performs IFFT processing of a transmit signal input from spreading section 102, generates an OFDM-CDMA signal, and outputs this OFDM-CDMA signal to GI insertion sections 104, 105, and 106. As shown in FIG. 2, an OFDM-CDMA signal can be generated by assigning one spreading code chip to one subcarrier. FIG. 2 shows a case in which all subcarriers are divided into four groups, G1 through G4. Any code multiplexing number, such as code multiplexing number 1, can be selected for an OFDM-CDMA signal generated by IFFT section 103. Here, the code multiplexing number is the number of multiplexings per carrier, and is determined by the number of users (codes) multiplexed. Therefore, in the case of code multiplexing number 1, only one user is assigned to one subcarrier.

GI insertion section 104 inserts a GI into a transmit signal input from IFFT section 103, and after GI insertion, outputs the transmit signal to selection section 107. The length of the GI inserted by GI insertion section 104 is shorter than for GI insertion section 105 and GI insertion section 106.

GI insertion section 105 inserts a GI into the transmit signal input from IFFT section 103, and after GI insertion, outputs the transmit signal to selection section 107. The length of the GI inserted by GI insertion section 105 is longer than the length of a GI inserted by GI insertion section 104, and shorter than the length of a GI inserted by GI insertion section 106. GI insertion section 105 can set the length of a GI inserted into a transmit signal arbitrarily, as long as that length is longer than the length of a GI inserted by GI insertion section 104, and shorter than the length of a GI inserted by GI insertion section 106, and also may insert a GI of a length that is an integral multiple of the length of a GI inserted by GI insertion section 104.

GI insertion section 106 inserts a GI into the transmit signal input from IFFT section 103, and after GI insertion, outputs the transmit signal to selection section 107. The length of the GI inserted by GI insertion section 106 is longer than for GI insertion section 104 and GI insertion section 105. GI insertion section 106 can set the length of a GI inserted into a transmit signal arbitrarily, as long as that length is longer than the length of GIs inserted by GI insertion section 104 and GI insertion section 105, and also may insert a GI of a length that is an integral multiple of the length of a GI inserted by GI insertion section 104.

Based on retransmission count information input from control section 101, selection section 107 selects one from among the transmit signals with a GI inserted input from GI insertion section 104, GI insertion section 105, and GI insertion section 106, and transmits the selected transmit signal from antenna 108. In transmit signal selection, based on retransmission count information, the transmit signal input from GI insertion section 104 is selected in the case of transmission that is not a retransmission, the transmit signal input from GI insertion section 105 is selected in the case of a first retransmission, and the transmit signal input from GI insertion section 106 is selected in the case of a second retransmission.

The operation of transmitting apparatus 100 will now be described using FIG. 3 through FIG. 6. First, a transmit signal is determined to be either a retransmission signal or a normal signal other than a retransmission signal by control section 101 (step (hereinafter referred to as "ST") 301). Furthermore, if the transmit signal is a retransmission signal, whether or not this is the first retransmission is determined by control section 101 (ST302). Control section 101 then outputs retransmission information containing information as to whether or not this is a retransmission signal and retransmission count information to selection section 107.

Next, an OFDM-CDMA signal that has undergone spreading processing by spreading section 102 and IFFT processing by IFFT section 103 has a GI inserted by GI insertion section 104, GI insertion section 105, and GI insertion section 106. If the lengths of GIs inserted by GI insertion section 105 and GI insertion section 106 are made integral multiples of the length of a GI inserted by GI insertion section 104, it is only necessary for the signal waveform of a GI inserted by GI insertion section 104 to be repeated a given number of times, and therefore processing for inserting GIs can be simplified, and there will be no incomplete leftovers when OFDM symbols are rearranged up to the end of a frame, as compared with the case where the GI length is not an integral multiple, making it possible to prevent processing from becoming cumbersome.

Figure 4:
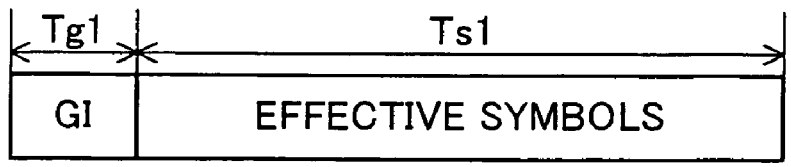
FIG. 4 is a drawing of a transmit signal with a GI inserted.
Figure 5:
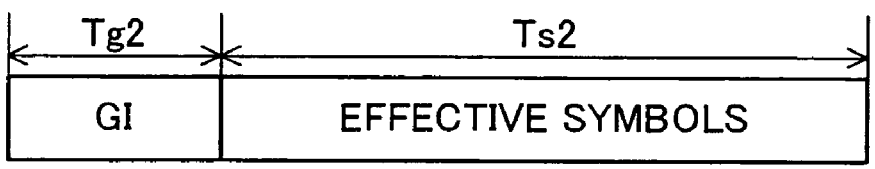
FIG. 5 is a drawing of a transmit signal with a GI inserted.

As shown in FIG. 4, a transmit signal in which a GI has been inserted by GI insertion section 104 includes a GI length Tg1 that is one-eighth of effective symbol length Ts1. Also, as shown in FIG. 5, a transmit signal in which a GI has been inserted by GI insertion section 105 includes a GI length Tg2 that is one-fourth of effective symbol length Ts2. Furthermore, as shown in FIG. 6, a transmit signal in which a GI has been inserted by GI insertion section 106 includes a GI length Tg3 that is three-eighths of effective symbol length Ts3.

Based on retransmission information input from control section 101, selection section 107 selects a transmit signal input from GI insertion section 104, 105, or 106. That is to say, if the transmit signal to be transmitted is not a retransmission signal, a transmit signal input from GI insertion section 104 is selected in which, as shown in FIG. 4, a GI length Tg1 that is one-eighth of effective symbol length Ts1 has been inserted (ST303).

Figure 6:
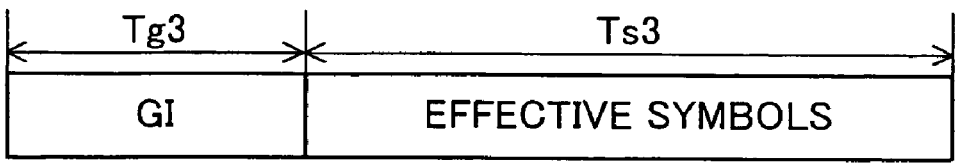
FIG. 6 is a drawing of a transmit signal with a GI inserted.

If, based on retransmission information input from control section 101, this transmission is a first retransmission, selection section 107 selects a transmit signal input from GI insertion section 105 in which, as shown in FIG. 5, a GI length Tg2 that is one-fourth of effective symbol length Ts2 has been inserted (ST304), and if this transmission is a second retransmission, selection section 107 selects a transmit signal input from GI insertion section 106 in which, as shown in FIG. 6, a GI length Tg3 that is three-eighths of effective symbol length Ts3 has been inserted (ST305).

Selection section 107 then outputs the selected transmit signal (ST306). As described above, the GI length increases in proportion as the number of retransmissions increases. The relationship between GI lengths is Tg1>Tg2>Tg3, and GIs are set longer in the order of FIG. 4, FIG. 5, and FIG. 6.

Thus, according to Embodiment 1, a selection section selects a transmit signal with a longer GI as the number of retransmissions increases, based on retransmission information input from a control section, so that the error rate improvement effect is heightened, and it is possible to prevent an increase in transmission delay due to an excessive increase in the number of retransmissions with almost no lowering of transmission efficiency. Also, delay time becomes shorter than the GI length as a result of increasing the GI length as the number of retransmissions increases, enabling inter-code interference to be reduced in a multipath environment.

Embodiment 2

Figure 7:
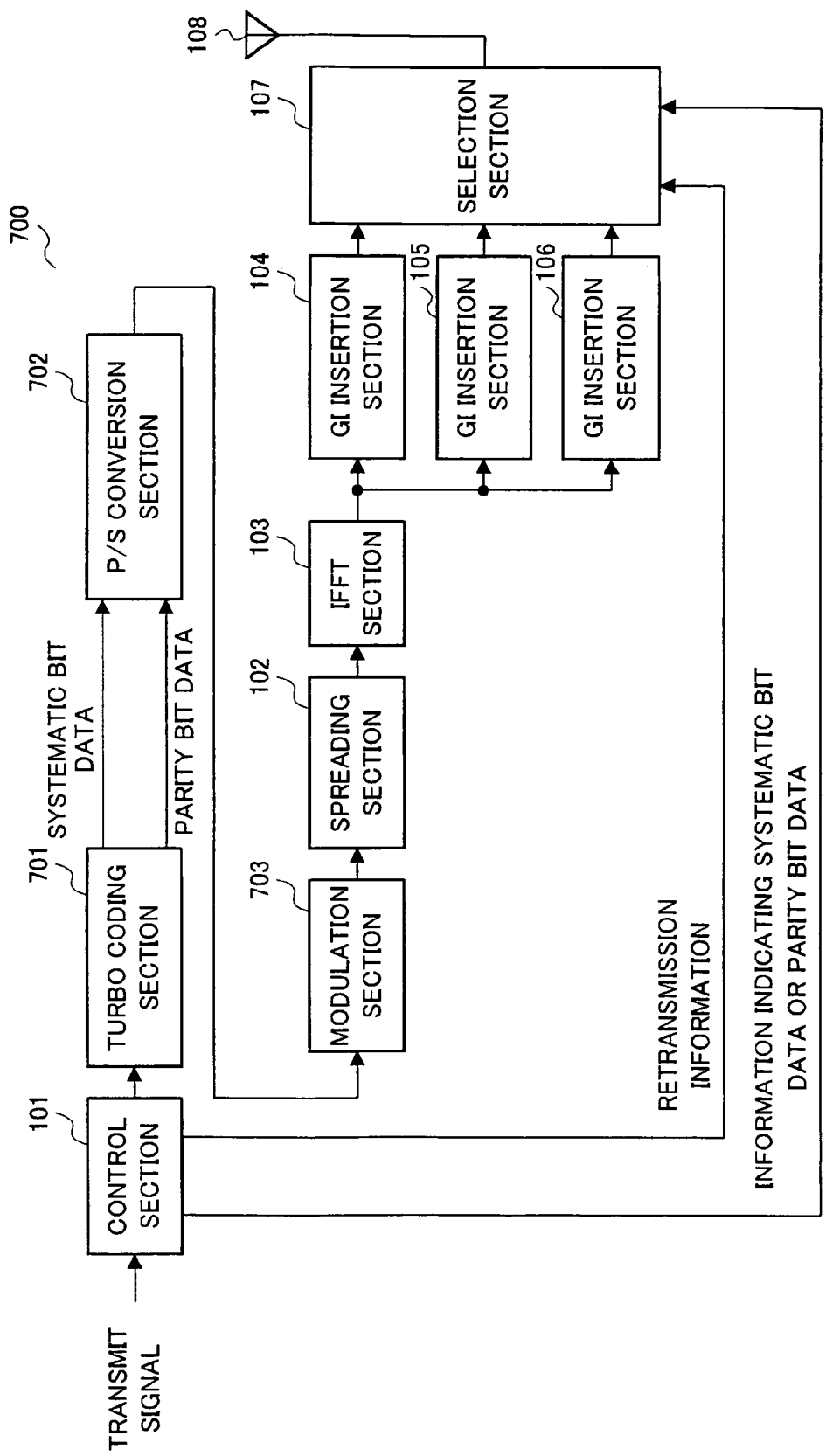
FIG. 7 is a block diagram showing the configuration of a transmitting apparatus according to Embodiment 2 of the present invention.
Figure 8:
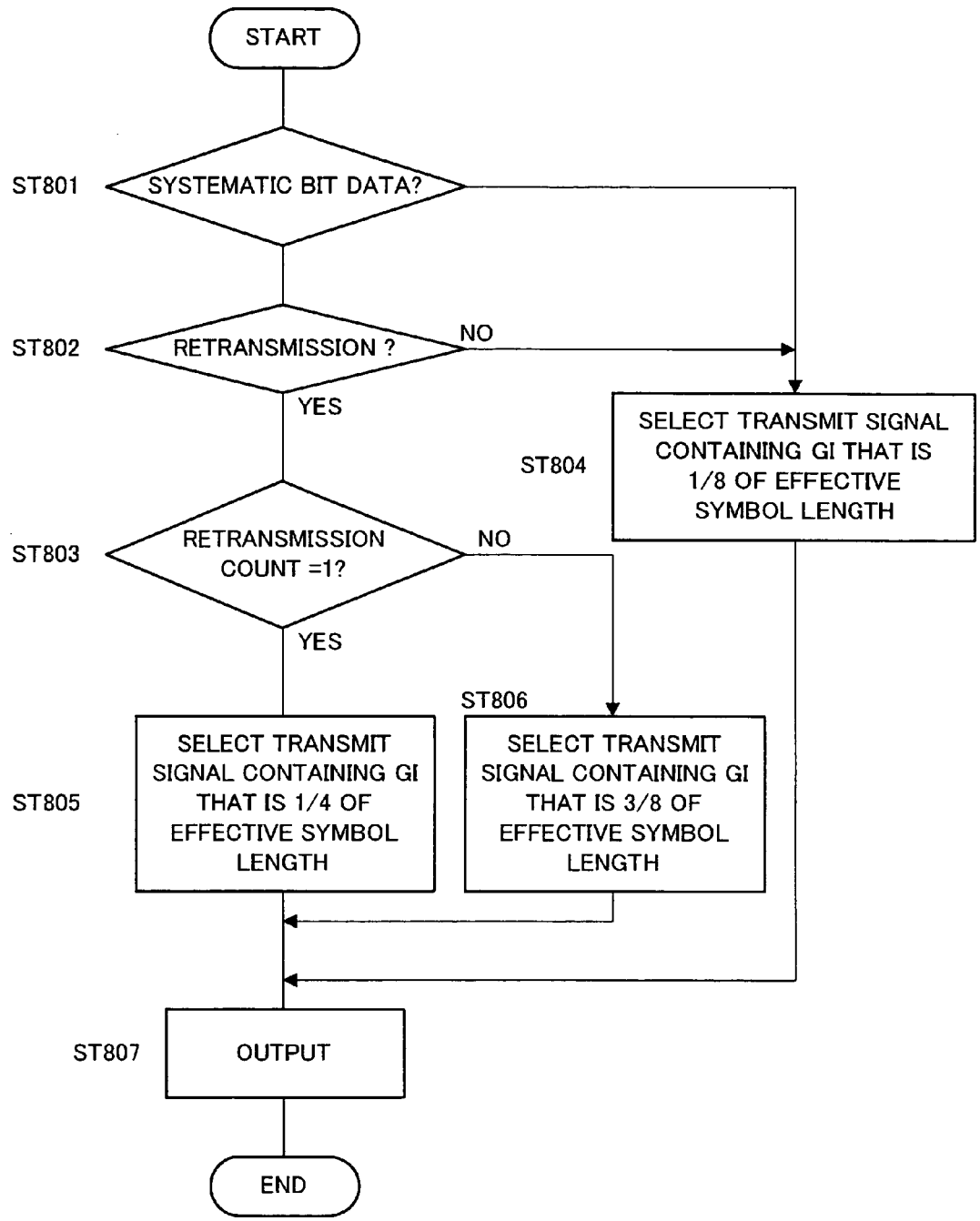
FIG. 8 is a flowchart showing the operation of a transmitting apparatus according to Embodiment 2 of the present invention.

FIG. 7 is a drawing showing the configuration of a transmitting apparatus 700 according to Embodiment 2 of the present invention. A feature of this embodiment is that GI lengths are set separately for systematic bit data and parity bit data. In this embodiment, the configuration in FIG. 7 differs from that in FIG. 1 in including a turbo coding section 701, a parallel/serial (hereinafter referred to as "P/S") conversion section 702, and a modulation section 703. Parts in FIG. 7 identical to those in FIG. 1 are assigned the same codes as in FIG. 1, and descriptions thereof are omitted.

When turbo code is used as an error correction code, systematic bit data and parity bit data are output, and better quality is required for systematic bit data. Therefore, by making the GI length of systematic bit data longer than the GI length of parity bit data, it is possible to further achieve compatibility between transmission efficiency and the error rate.

Control section 101 temporarily stores transmit signals, and separates transmit signals into retransmission signals and normal signals other than retransmission signals. Then, when transmission timing is reached, control section 101 outputs a transmit signal to spreading section 102, and also outputs retransmission information to selection section 107. Retransmission information includes retransmission count information. Control section 101 also controls the transmission timing at which systematic bit data and parity bit data are output, and outputs information as to whether a transmit signal is systematic bit data or parity bit data to selection section 107.

Turbo coding section 701 outputs part of a transmit signal input from control section 101 uncoded to P/S conversion section 702 as systematic bit data, and also performs recursive convolutional coding on the remaining part of the input transmit signal and outputs this part to P/S conversion section 702 as parity bit data.

P/S conversion section 702, which is an allocation section, converts systematic bit data and parity bit data input from turbo coding section 701 from parallel data format to serial data format, and outputs these data to modulation section 703. Systematic bit data and parity bit data converted by P/S conversion section 702 is made up of all systematic bits or parity bits on a symbol-by-symbol basis.

Modulation section 703, which is an allocation section, modulates systematic bits or parity bits of each symbol input from P/S conversion section 702 and outputs the result to spreading section 102.

GI insertion sections 104, 105, and 106 insert GIs independently for systematic bit data and parity bit data. In this case, the length of a GI inserted in parity bit data may be shorter than the length of a GI inserted in systematic bit data, and furthermore the GI length of parity bit data may be made the same irrespective of the number of retransmissions, and the GI length of systematic bit data may be increased as the number of retransmissions increases.

Based on information indicating the retransmission count and whether or not the transmit data is systematic bit data or parity bit data input from control section 101, selection section 107 selects one from among the transmit signals with a GI inserted input from GI insertion section 104, GI insertion section 105, and GI insertion section 106, and transmits the selected transmit signal from antenna 108. That is to say, control is performed so that if the transmit data is systematic bit data, the GI length is increased as the number of retransmissions increases, and if the transmit data is parity bit data, the GI length does not change even if the number of retransmissions increases.

The operation of transmitting apparatus 700 will now be described using FIG. 4, FIG. 5, FIG. 6, and FIG. 8. Control section 101 determines whether or not a transmit signal is systematic bit data (ST801), and outputs information as to whether or not the transmit data is systematic bit data to selection section 107. If the transmit data is systematic bit data, control section 101 determines whether or not this is a retransmission (ST802), and in the case of a retransmission further determines whether or not this is the first retransmission (ST803), and outputs retransmission information including information as to whether or not the transmit signal is a retransmission signal and, if the transmit signal is a retransmission signal, retransmission count information, to selection section 107.

Based on information as to whether or not the transmit signal is systematic bit data, input from control section 101, if the transmit signal is not systematic bit data but parity bit data, selection section 107 selects a transmit signal input from GI insertion section 104 in which, as shown in FIG. 4, a GI length Tg1 that is one-eighth of effective symbol length Ts1 has been inserted (ST804). If parity bit data GI length Tg1 is fixed at one-eighth of effective symbol length Ts1, and only the length of the GI inserted in a systematic bit data transmit signal for which good quality is required is changed, it is possible to improve error rate characteristics without lowering transmission efficiency, and to achieve compatibility between transmission efficiency and error rate characteristics.

Also, based on information as to whether or not the transmit signal is systematic bit data and retransmission information, if the transmit signal is systematic bit data and the transmit signal is not a retransmission signal, selection section 107 selects a transmit signal input from GI insertion section 104 in which, as shown in FIG. 4, a GI length Tg1 that is one-eighth of effective symbol length Ts1 has been inserted (ST804).

Furthermore, if, based on retransmission information input from control section 101, this transmission is a first retransmission, selection section 107 selects a transmit signal input from GI insertion section 105 in which, as shown in FIG. 5, a GI length Tg2 that is one-fourth of effective symbol length Ts2 has been inserted (ST805), and if this transmission is a second retransmission, selection section 107 selects a transmit signal input from GI insertion section 106 in which, as shown in FIG. 6, a GI length Tg3 that is three-eighths of effective symbol length Ts3 has been inserted (ST806).

Selection section 107 then outputs the transmit signal (ST807).

Thus, according to Embodiment 2, in addition to provision of the effects of Embodiment 1 described above, turbo coding of transmit data is performed by a turbo coding section that enables much better error rate characteristics to be obtained that with other error correction methods, and a selection section increases the length of a GI inserted in systematic bit data as the number of retransmissions increases, enabling error rate characteristics to be significantly improved.

In this embodiment, the length of a GI inserted in systematic bit data in the case of retransmission is made longer than a GI inserted in parity bit data, but this is not a limitation, and the length of a GI inserted in systematic bit data in the case of retransmission may be made the same as the length of a GI inserted in parity bit data.

Embodiment 3

Figure 9:
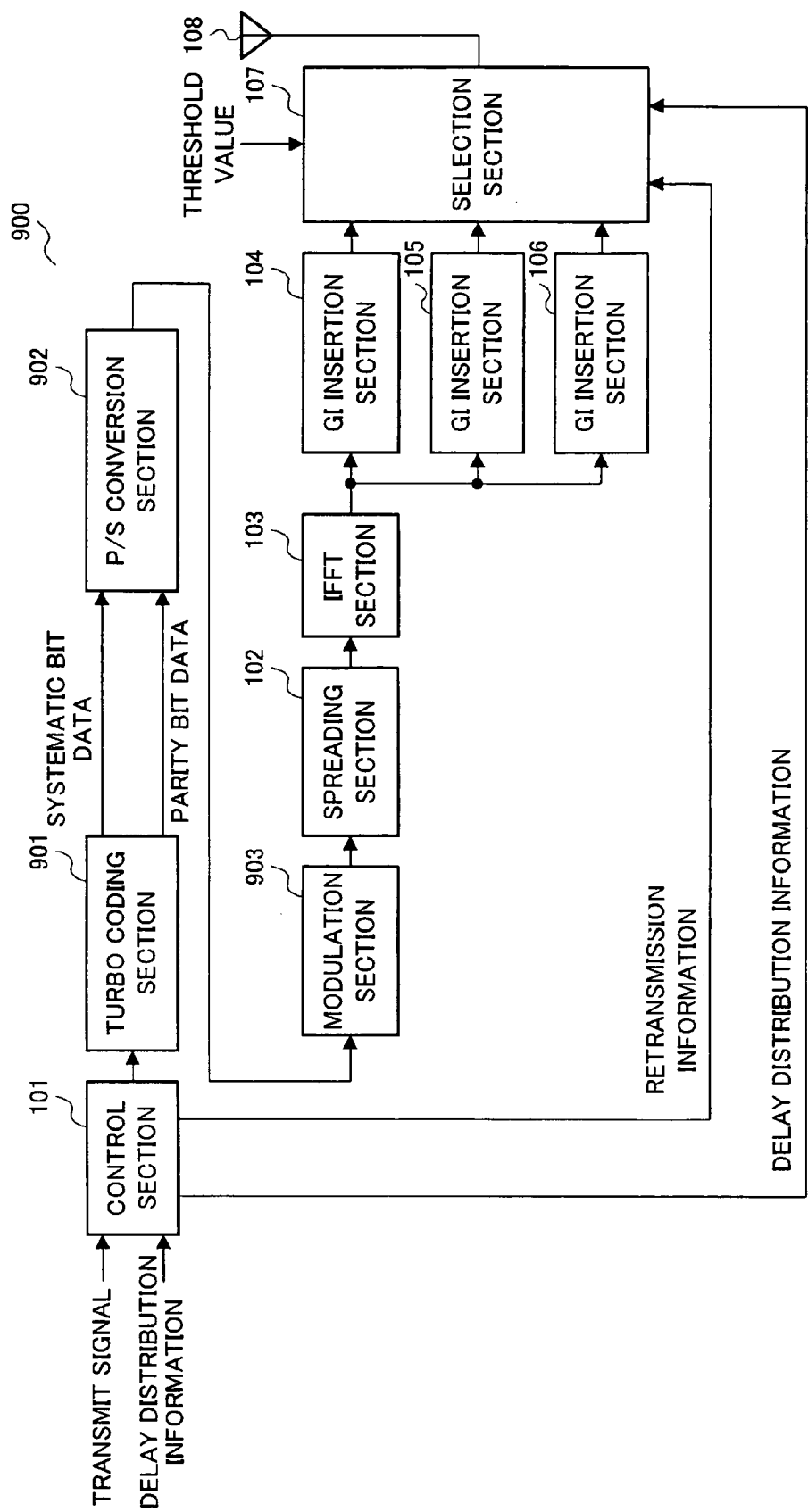
FIG. 9 is a block diagram showing the configuration of a transmitting apparatus according to Embodiment 3 of the present invention.

FIG. 9 is a drawing showing the configuration of a transmitting apparatus 900 according to Embodiment 3 of the present invention. A feature of this embodiment is that the length of a GI is selected taking delay distribution information into consideration. In this embodiment, the configuration in FIG. 9 differs from that in FIG. 1 in including a turbo coding section 901 and a P/S conversion section 902. Parts in FIG. 9 identical to those in FIG. 1 are assigned the same codes as in FIG. 1, and descriptions thereof are omitted.

The length of a GI can generally be determined according to delay distribution. Therefore, if delay distribution information is reflected in determining GI length, it is possible to further achieve compatibility between transmission efficiency and the error rate.

Control section 101 temporarily stores transmit signals, and separates transmit signals into retransmission signals and normal signals other than retransmission signals. Then, when transmission timing is reached, control section 101 outputs a transmit signal to spreading section 102, and also outputs retransmission information to selection section 107. Retransmission information includes retransmission count information. Control section 101 also outputs delay distribution information to selection section 107. Delay distribution information is reported by being included in a transmit signal from the communicating party, and is therefore extracted from a received signal. The configuration of a delay distribution generation section on the communicating party side will be described later herein.

Turbo coding section 901 outputs part of a transmit signal input from control section 101 uncoded to P/S conversion section 902 as systematic bit data, and also performs recursive convolutional coding on the remaining part of the input transmit signal and outputs this part to P/S conversion section 902 as parity bit data.

P/S conversion section 902 converts systematic bit data and parity bit data input from turbo coding section 901 from parallel data format to serial data format, and outputs these data to modulation section 903.

Based on retransmission count information and delay distribution information input from control section 101, selection section 107 selects one from among the transmit signals with a GI inserted input from GI insertion section 104, GI insertion section 105, and GI insertion section 106, and transmits the selected transmit signal from antenna 108. That is to say, if delay distribution is small, the transmit signal input from GI insertion section 105 will be selected even if the transmission is a second retransmission.

The operation of delay distribution information generation section 1000 will now be described using FIG. 10. Delay distribution information generation section 1000 is mainly composed of a delay circuit 1001, a subtraction circuit 1002, an absolute value generation circuit 1003, and an averaging circuit 1004.

Delay circuit 1001 has as input a signal in which the preamble of a received signal has undergone FFT processing, applies delay to the input signal, and outputs the signal to subtraction circuit 1002.

Subtraction circuit 1002 calculates the difference in signal levels of adjacent subcarriers, and outputs the result to absolute value generation circuit 1003.

Absolute value generation circuit 1003 converts the subtraction result input from subtraction circuit 1002 to an absolute value, and outputs this absolute value to averaging circuit 1004.

Averaging circuit 1004 averages absolute values of reception level differences input from absolute value generation circuit 1003 for the number of subcarriers, and delay distribution information is obtained. The delay distribution information obtained in this way is transmitted included in a transmit signal by the communicating party.

Figure 10:
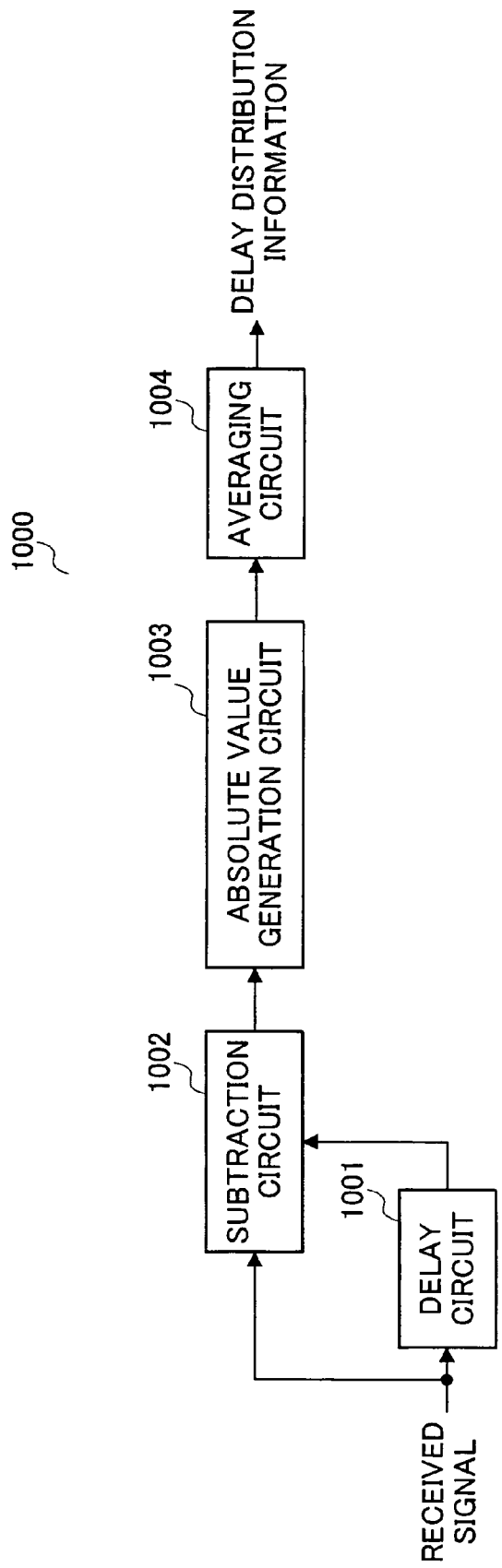
FIG. 10 is a block diagram showing the configuration of a delay distribution information generation section.
Figure 11:
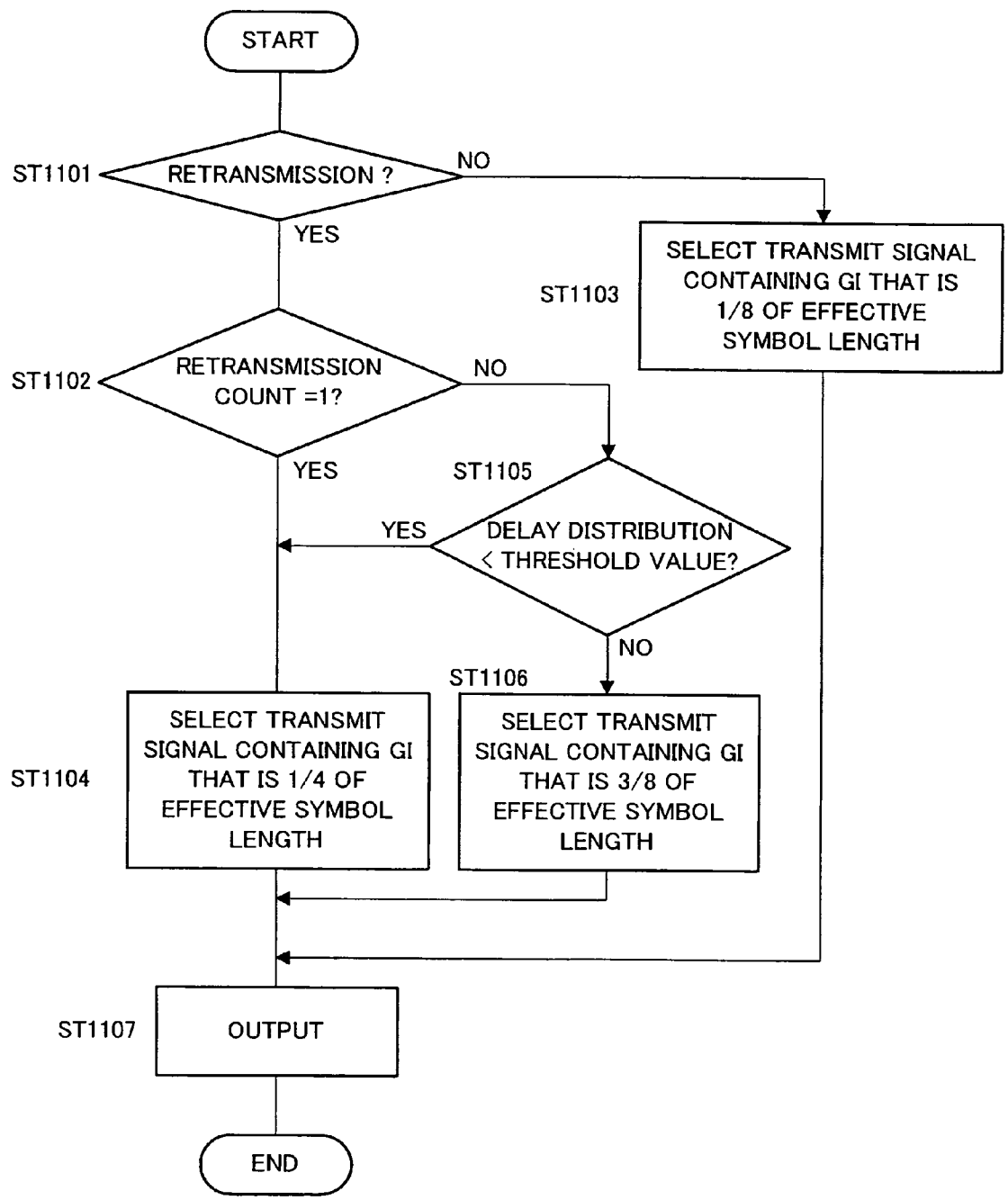
FIG. 11 is a flowchart showing the operation of a transmitting apparatus according to Embodiment 3 of the present invention.

Delay distribution information is not limited to the case where it is found by a communicating party and reported by the communicating party, and delay distribution may be detected from the circuit in FIG. 10 using a received signal. The case where delay distribution is detected from a received signal is possible with the TDD communication method or the like.

The operation of transmitting apparatus 900 will now be described using FIG. 4, FIG. 5, FIG. 6, and FIG. 11. Control section 101 determines whether or not a transmit signal is a retransmission signal (ST1101), and in the case of a retransmission further determines whether or not this is the first retransmission (ST1102), and outputs retransmission information including information as to whether or not the transmit signal is a retransmission signal and, if the transmit signal is a retransmission signal, retransmission count information, to selection section 107. Control section 101 also outputs delay distribution information reported from the communicating party, included in the received signal, to selection section 107.

Based on retransmission information input from control section 101, if the transmit signal to be transmitted is not a retransmission signal, selection section 107 selects a transmit signal in which, as shown in FIG. 4, a GI length Tg1 that is one-eighth of effective symbol length Ts1 has been inserted (ST1103).

Based on retransmission information input from control section 101, if this transmission is a first retransmission, selection section 107 selects a transmit signal in which, as shown in FIG. 5, a GI length Tg2 that is one-fourth of effective symbol length Ts2 has been inserted (ST1104), and if this transmission is a second retransmission, selection section 107 determines from the delay distribution information input from control section 101 whether or not the delay distribution is less than a threshold value (ST1105).

If the delay distribution is less than the threshold value, selection section 107 selects a transmit signal in which, as shown in FIG. 5, a GI length Tg2 that is one-fourth of effective symbol length Ts2 has been inserted (ST1104), and if the delay distribution is greater than or equal to the threshold value, selection section 107 selects a transmit signal in which, as shown in FIG. 6, a GI length Tg3 that is three-eighths of effective symbol length Ts3 has been inserted (ST1106).

Selection section 107 then outputs a transmit signal in which the selected GI length has been inserted (ST1107).

Thus, according to Embodiment 3, in addition to provision of the effects of Embodiment 1 described above, a selection section selects a transmit signal that includes a GI of a length that takes delay distribution information into consideration, so that if GI length need not be increased much even though the number of retransmissions increases, a transmit signal with an unnecessarily long GI is not selected, and transmission efficiency can be improved to the greatest extent possible.

In this embodiment, the magnitude of delay distribution is determined at the time of a second retransmission, but this is not a limitation, and the magnitude of delay distribution may be determined at the time of a first retransmission.

Embodiment 4

Figure 12:
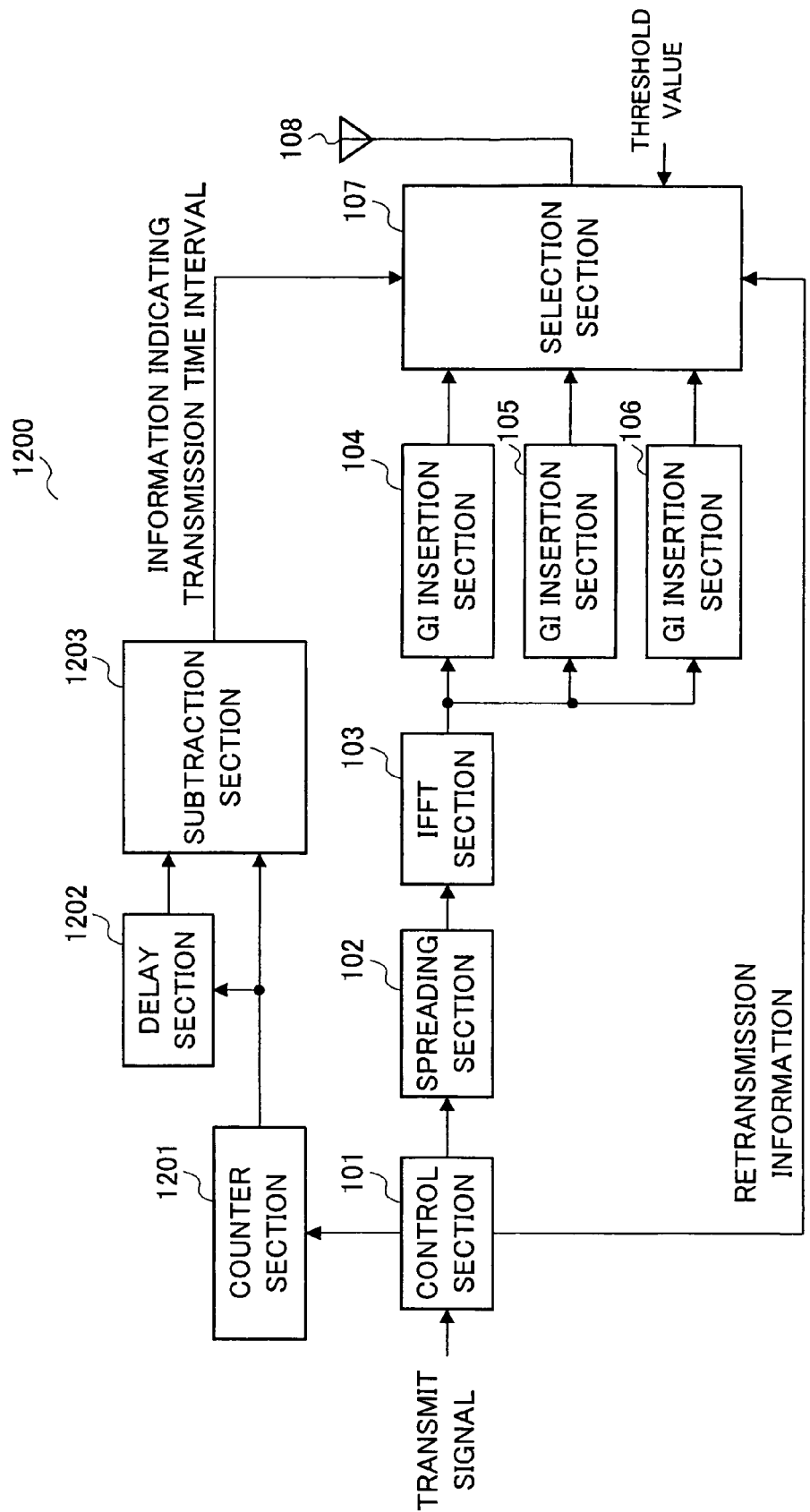
FIG. 12 is a block diagram showing the configuration of a transmitting apparatus according to Embodiment 4 of the present invention.
Figure 13:
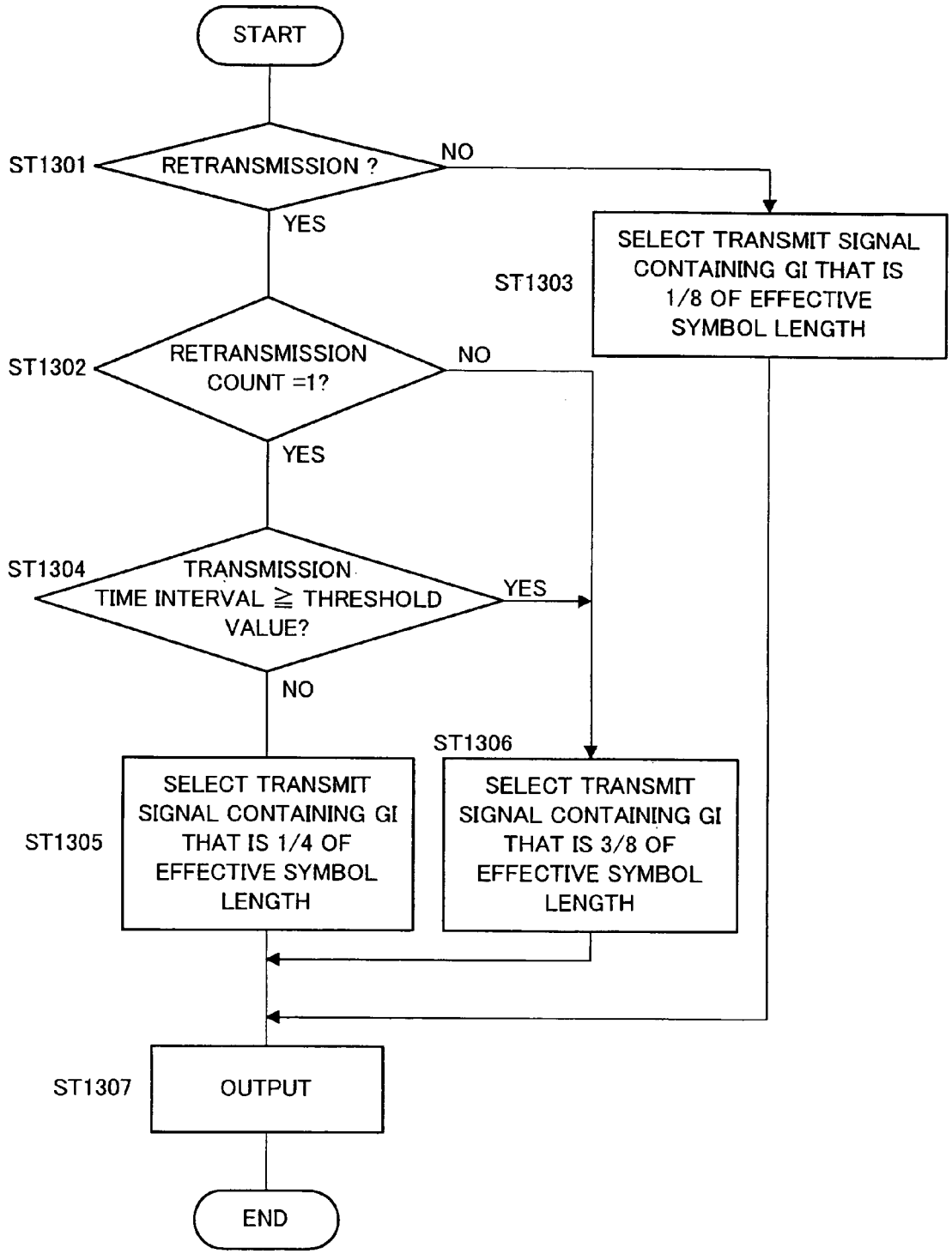
FIG. 13 is a flowchart showing the operation of a transmitting apparatus according to Embodiment 4 of the present invention.

FIG. 12 is a drawing showing the configuration of a transmitting apparatus 1200 according to Embodiment 4 of the present invention. A feature of this embodiment is that the length of a GI is selected taking the transmission time interval into consideration. In this embodiment, the configuration in FIG. 12 differs from that in FIG. 1 in including a counter section 1201, a delay section 1202, and a subtraction section 1203. Parts in FIG. 12 identical to those in FIG. 1 are assigned the same codes as in FIG. 1, and descriptions thereof are omitted.

When CSMA (Carrier Sense Multiple Access) is used as an access method, as in IEEE802.11, if a channel is congested the time interval between the previous transmission and the present transmission may be very long. In such cases, transmission delay may be extremely long if there is an error in a second or third retransmission. An effective method of preventing this problem is to select GI length taking the transmission time interval between the previous transmission and the present transmission into consideration. In CSMA, a terminal performs carrier sensing and transmits if the reception level is less than or equal to a threshold value.

Counter section 1201 generates information indicating transmission timing based on transmission timing input from control section 101, and outputs this generated information to delay section 1202 and subtraction section 1203.

Delay section 1202 delays the information indicating transmission timing input from counter section 1201, and outputs this information to subtraction section 1203.

From the information indicating transmission timing input from counter section 1201 and the transmission timing input from delay section 1202, subtraction section 1203 calculates the difference between the transmission timing of the previous transmission and the transmission timing of the present transmission, and outputs the calculated transmission timing difference to selection section 107 as a transmission time interval.

Based on retransmission count information input from control section 101 and information indicating the transmission time interval input from subtraction section 1203, selection section 107 selects one from among the transmit signals with a GI inserted input from GI insertion section 104, GI insertion section 105, and GI insertion section 106, and transmits the selected transmit signal from antenna 108. That is to say, if the transmission time interval is large, the transmit signal input from GI insertion section 106, which has the longest GI of the three kinds of GI, will be selected even in the case of a first retransmission.

The operation of transmitting apparatus 1200 will now be described using FIG. 4, FIG. 5, FIG. 6, and FIG. 13. Control section 101 determines whether or not a transmit signal is a retransmission signal (ST1301), and in the case of a retransmission further determines whether or not this is the first retransmission (ST1302), and outputs retransmission information including information as to whether or not the transmit signal is a retransmission signal and, if the transmit signal is a retransmission signal, retransmission count information, to selection section 107. Control section 101 also outputs information indicating the calculated transmission time interval to selection section 107.

Based on retransmission information input from control section 101, if the transmit signal to be transmitted is not a retransmission signal, selection section 107 selects a transmit signal in which, as shown in FIG. 4, a GI length Tg1 that is one-eighth of effective symbol length Ts1 has been inserted (ST1303).

Based on retransmission information input from control section 101, if this transmission is a first retransmission, selection section 107 determines whether or not the transmission time interval is greater than or equal to a threshold value (ST1304), and if this transmission is a second retransmission, selection section 107 selects a transmit signal in which, as shown in FIG. 6, a GI length Tg3 that is three-eighths of effective symbol length Ts3 has been inserted (ST1306).

If the transmission time interval input from control section 101 is less than the threshold value, selection section 107 selects a transmit signal in which, as shown in FIG. 5, a GI length Tg2 that is one-fourth of effective symbol length Ts2 has been inserted (ST1305), and if the transmission time interval is greater than or equal to the threshold value, selection section 107 selects a transmit signal in which, as shown in FIG. 6, a GI length Tg3 that is three-eighths of effective symbol length Ts3 has been inserted (ST1306).

Selection section 107 then outputs a transmit signal in which the selected GI length has been inserted (ST1307).

Thus, according to Embodiment 4, in addition to provision of the effects of Embodiment 1 described above, a selection section selects a transmit signal that includes a GI of a length that takes the transmission time interval into consideration, making it possible to prevent transmission delay from becoming extremely long due to numerous retransmissions when the transmission time interval is long.

In this embodiment, the length of the transmission time interval is compared at the time of a first retransmission, but this is not a limitation, and the length of the transmission time interval may be compared at the time of a transmission that is not a retransmission.

Embodiment 5

Figure 14:
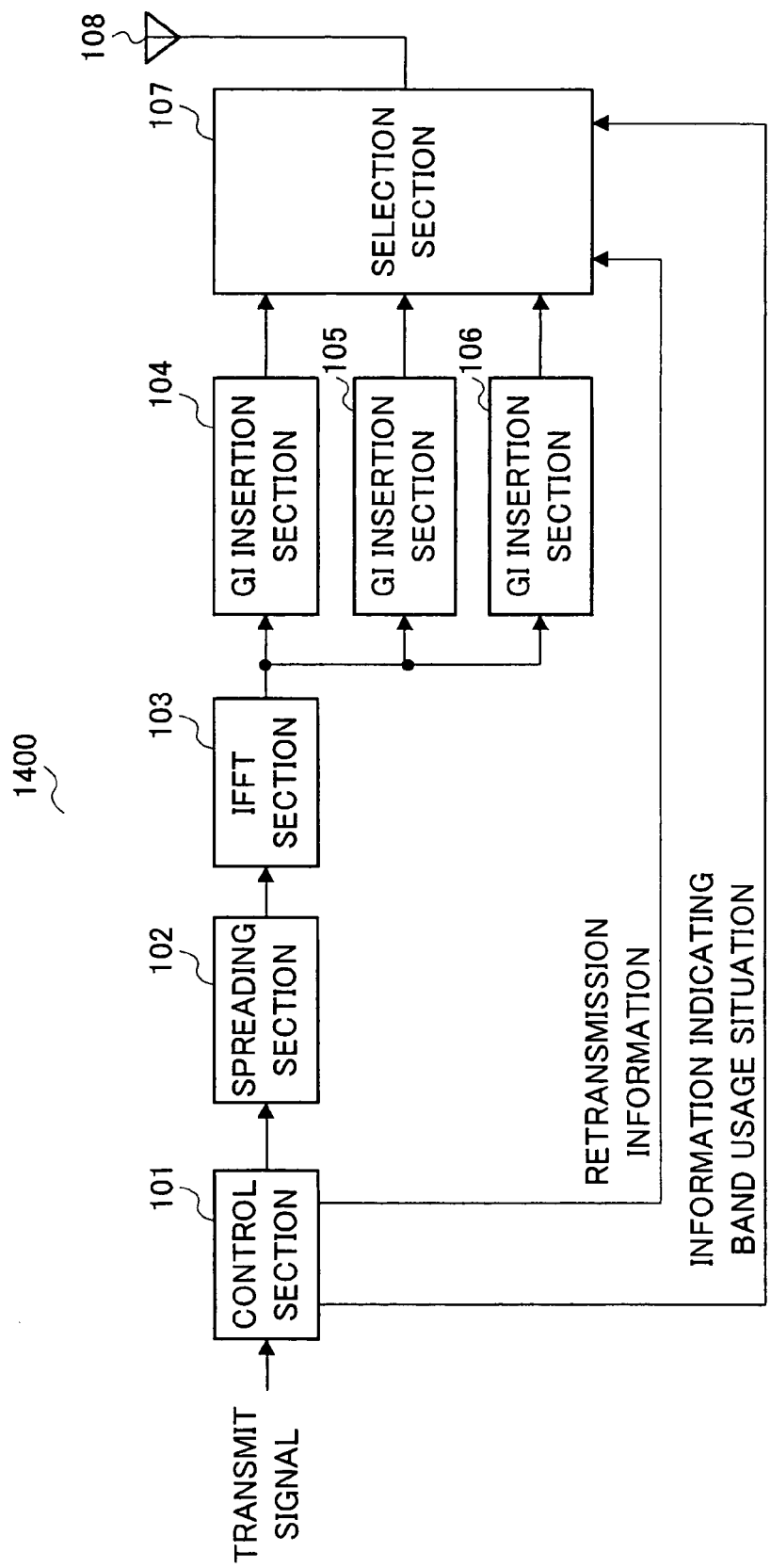
FIG. 14 is a block diagram showing the configuration of a transmitting apparatus according to Embodiment 5 of the present invention.
Figure 15:
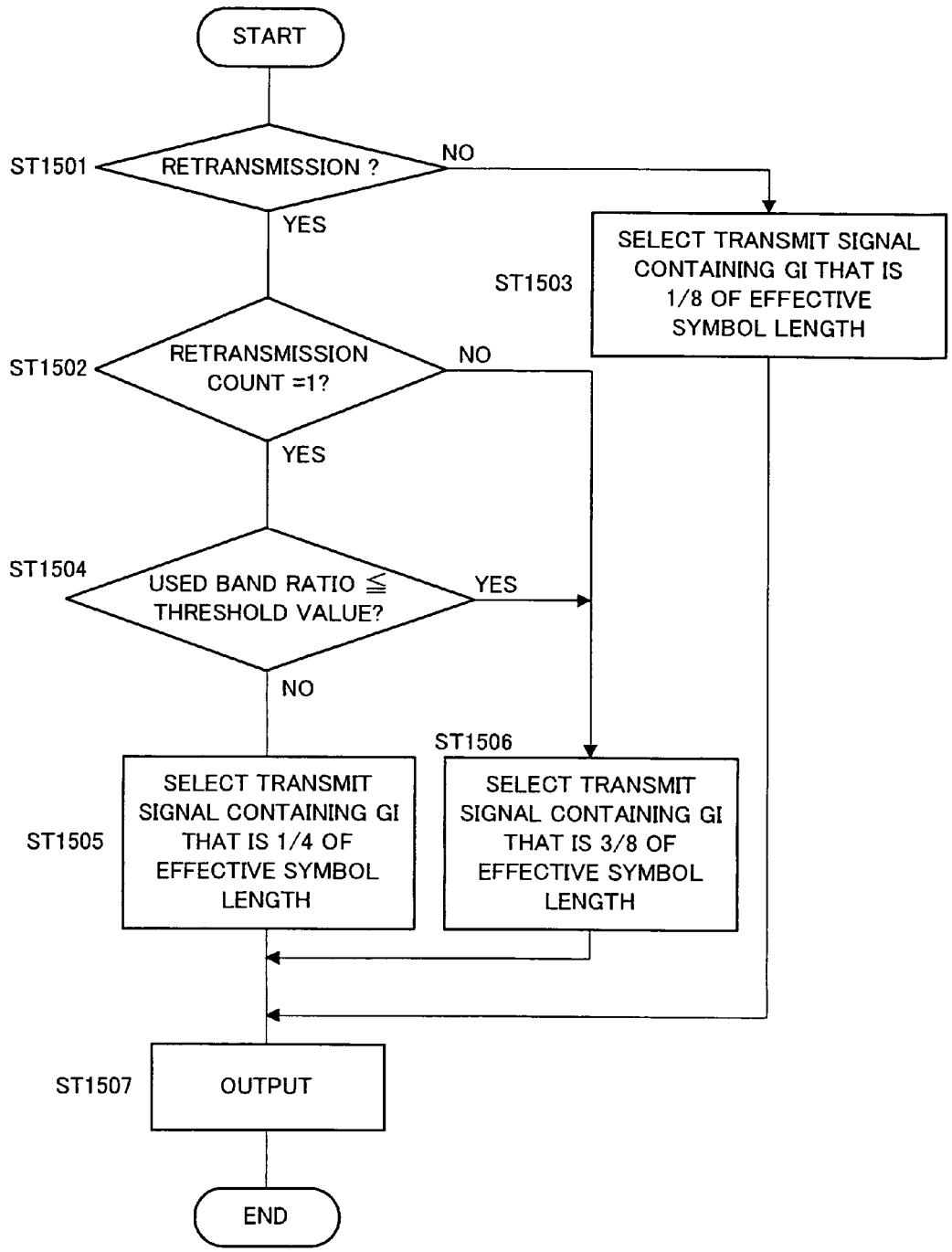
FIG. 15 is a flowchart showing the operation of a transmitting apparatus according to Embodiment 5 of the present invention.

FIG. 14 is a drawing showing the configuration of a transmitting apparatus 1400 according to Embodiment 5 of the present invention. A feature of this embodiment is that the length of a GI is selected taking the band usage situation into consideration. Parts in FIG. 14 identical to those in FIG. 1 are assigned the same codes as in FIG. 1, and descriptions thereof are omitted.

If information on the band usage situation is reported from the communicating party, or the band whose use is permitted is known as a usable bandwidth, control section 101 can ascertain how much of a margin there is in the remaining band from the used band currently being used, and outputs information on the ratio of the used band to the band whose use is permitted to selection section 107.

Based on retransmission count information and information indicating the band usage situation input from control section 101, selection section 107 selects one from among the transmit signals with a GI inserted input from GI insertion section 104, GI insertion section 105, and GI insertion section 106, and transmits the selected transmit signal from antenna 108. That is to say, if there is a margin in the band, the transmit signal input from GI insertion section 106, which has the longest GI of the three kinds of GI, will be selected even in the case of a first retransmission.

The operation of transmitting apparatus 1400 will now be described using FIG. 4, FIG. 5, FIG. 6, and FIG. 15. Control section 101 determines whether or not a transmit signal is a retransmission signal (ST1501), and in the case of a retransmission further determines whether or not this is the first retransmission (ST1502), and outputs retransmission information including information as to whether or not the transmit signal is a retransmission signal and, if the transmit signal is a retransmission signal, retransmission count information, to selection section 107. Control section 101 also outputs information indicating the band usage situation for each communicating party to selection section 107.

Based on retransmission information input from control section 101, if the transmit signal to be transmitted is not a retransmission signal, selection section 107 selects a transmit signal in which, as shown in FIG. 4, a GI length Tg1 that is one-eighth of effective symbol length Ts1 has been inserted (ST1503).

Based on retransmission information and information indicating the band usage situation input from control section 101, if this transmission is a first retransmission, selection section 107 determines whether or not the ratio of the used band to the band whose use is permitted is less than or equal to a threshold value (ST1504), and if this transmission is a second retransmission, selection section 107 selects a transmit signal in which, as shown in FIG. 6, a GI length Tg3 that is three-eighths of effective symbol length Ts3 has been inserted (ST1506).

If the ratio of the used band to the band whose use is permitted is greater than the threshold value, selection section 107 selects a transmit signal in which, as shown in FIG. 5, a GI length Tg2 that is one-fourth of effective symbol length Ts2 has been inserted (ST1505), and if the ratio of the used band to the band whose use is permitted is less than or equal to the threshold value, selection section 107 selects a transmit signal in which, as shown in FIG. 6, a GI length Tg3 that is three-eighths of effective symbol length Ts3 has been inserted (ST1506). Thus selection section 107 selects a transmit signal in which a GI has been inserted that depends on the used band, so that when there is a used band margin the GI can be made longer without lowering transmission efficiency, and when there is not much of a margin in the used band control can be performed so that the GI is not made unnecessarily long, making it possible to prevent a decrease in transmission efficiency.

Selection section 107 then outputs a transmit signal in which the selected GI length has been inserted (ST1507).

Thus, according to Embodiment 5, in addition to provision of the effects of Embodiment 1 described above, a selection section selects a transmit signal in which a GI of a length that depends on the band usage situation has been inserted, making it possible to prevent transmission delay without lowering transmission efficiency.

In this embodiment, the ratio of the used band to the band whose use is permitted is determined at the time of a first retransmission, but this is not a limitation, and the ratio of the used band to the band whose use is permitted may be determined at the time of a transmission that is not a retransmission.

Embodiment 6

Figure 16:
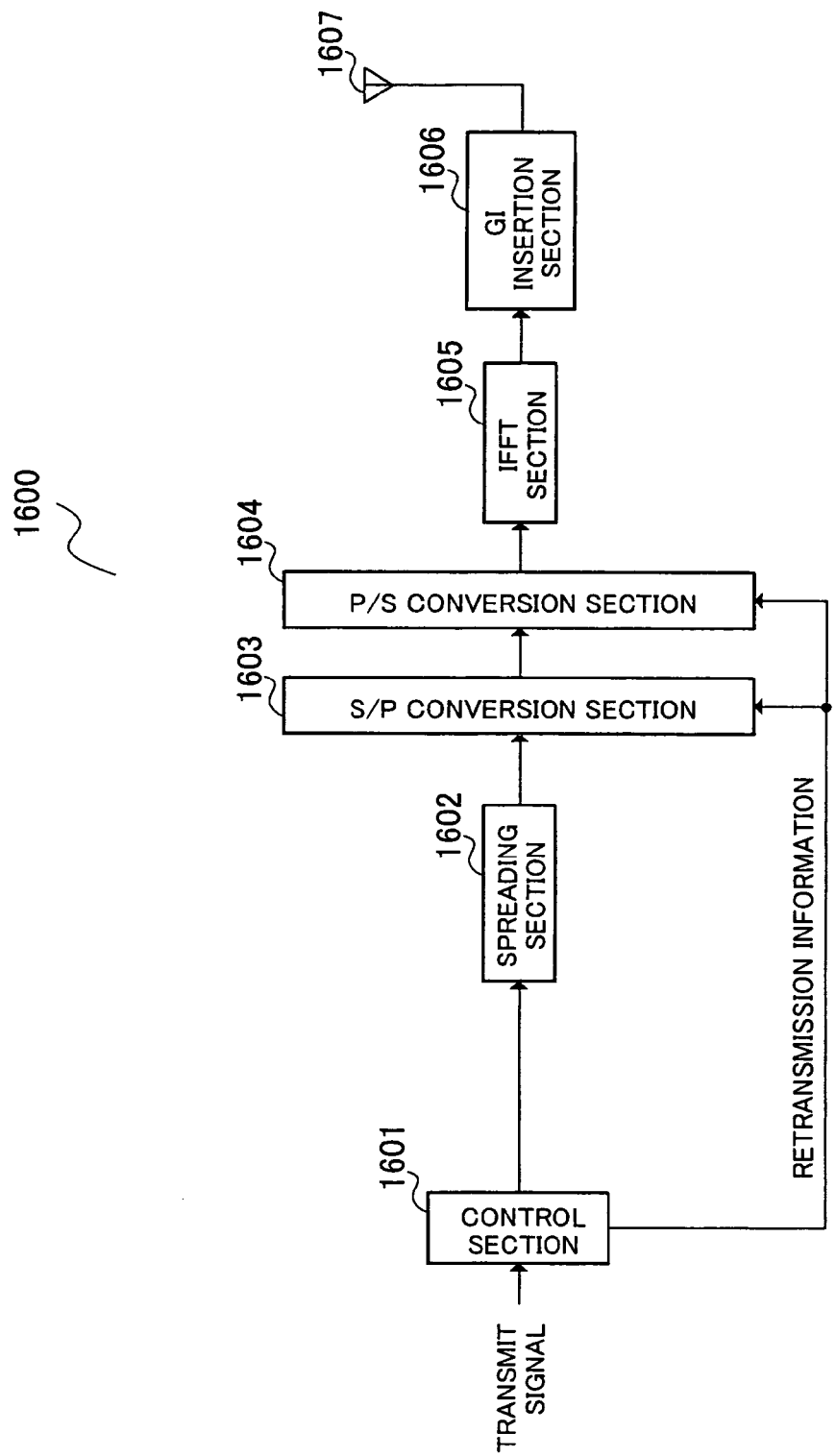
FIG. 16 is a block diagram showing the configuration of a transmitting apparatus according to Embodiment 6 of the present invention.

FIG. 16 is a block diagram showing part of the configuration of a transmitting apparatus according to Embodiment 6 of the present invention.

Transmitting apparatus 1600 is mainly composed of a control section 1601, a serial/parallel (hereinafter referred to as "S/P") conversion section 1603, a P/S conversion section 1604, an IFFT section 1605, a GI insertion section 1606, and an antenna 1607.

Control section 1601 temporarily stores transmit signals modulated by a modulation section (not shown) and separates transmit signals into retransmission information and normal information other than retransmission information. Then, when transmission timing is reached, control section 1601 outputs a transmit signal to spreading section 1602, and also outputs retransmission information to S/P conversion section 1603 and P/S conversion section 1604. Retransmission information includes information on the retransmission count and data to be retransmitted.

Spreading section 1602 carries out spreading processing of transmit signals input from control section 1601 using different spreading codes, performs code division multiplexing, and generates a CDMA signal, which is output to S/P conversion section 1603. As spreading ratio 1, spreading section 1602 may output a transmit signal directly to IFFT section 103 without spreading that transmit signal. In this case, the signal processed by IFFT section 103 is an OFDM signal.

When retransmission information input from control section 1601 indicates a normal transmission, not a retransmission, S/P conversion section 1603, which is a rearranging section, converts the transmit signal input from spreading section 1602 directly from serial data format to parallel data format, and outputs the resulting signal to P/S conversion section 1604. On the other hand, when retransmission information input from control section 1601 indicates a retransmission, S/P conversion section 1603 converts the transmit signal to parallel data format and stores it in memory, and reads data to be retransmitted contained in the retransmission information from memory a number of times in accordance with the retransmission count, and outputs this data to P/S conversion section 1604.

In a first transmission, P/S conversion section 1604, which is a rearranging section, converts a transmit signal input from S/P conversion section 1603 directly from parallel data format to serial data format, and outputs this signal to IFFT section 1605. On the other hand, in a retransmission, P/S conversion section 1604 performs rearrangement of a transmit signal including retransmission data input from S/P conversion section 1603 according to retransmission information input from control section 1601, and outputs the rearranged transmit signal to IFFT section 1605. The method of rearranging the transmit signal will be described later herein.

IFFT section 1605, which is an orthogonal frequency division multiplexing section, performs orthogonal frequency division multiplexing processing such as IFFT processing of a transmit signal input from GI insertion section 104, generates an OFDM-CDMA signal, and outputs this OFDM-CDMA signal to GI insertion section 106. An OFDM-CDMA signal can be generated by assigning one spreading code chip to one subcarrier. Any code multiplexing number, such as code multiplexing number 1, can be selected for an OFDM-CDMA signal generated by IFFT section 103. Here, the code multiplexing number is the number of multiplexings per carrier, and is determined by the number of users (codes) multiplexed. Therefore, in the case of code multiplexing number 1, only one user is assigned to one subcarrier.

GI insertion section 1606 inserts a predetermined GI into a transmit signal input from IFFT section 1605, and transmits the transmit signal from antenna 1607. A radio section (not shown) is provided between GI insertion section 106 and antenna 1607, and processing such as up-conversion from baseband frequency to radio frequency is performed by this radio section.

Figure 17:
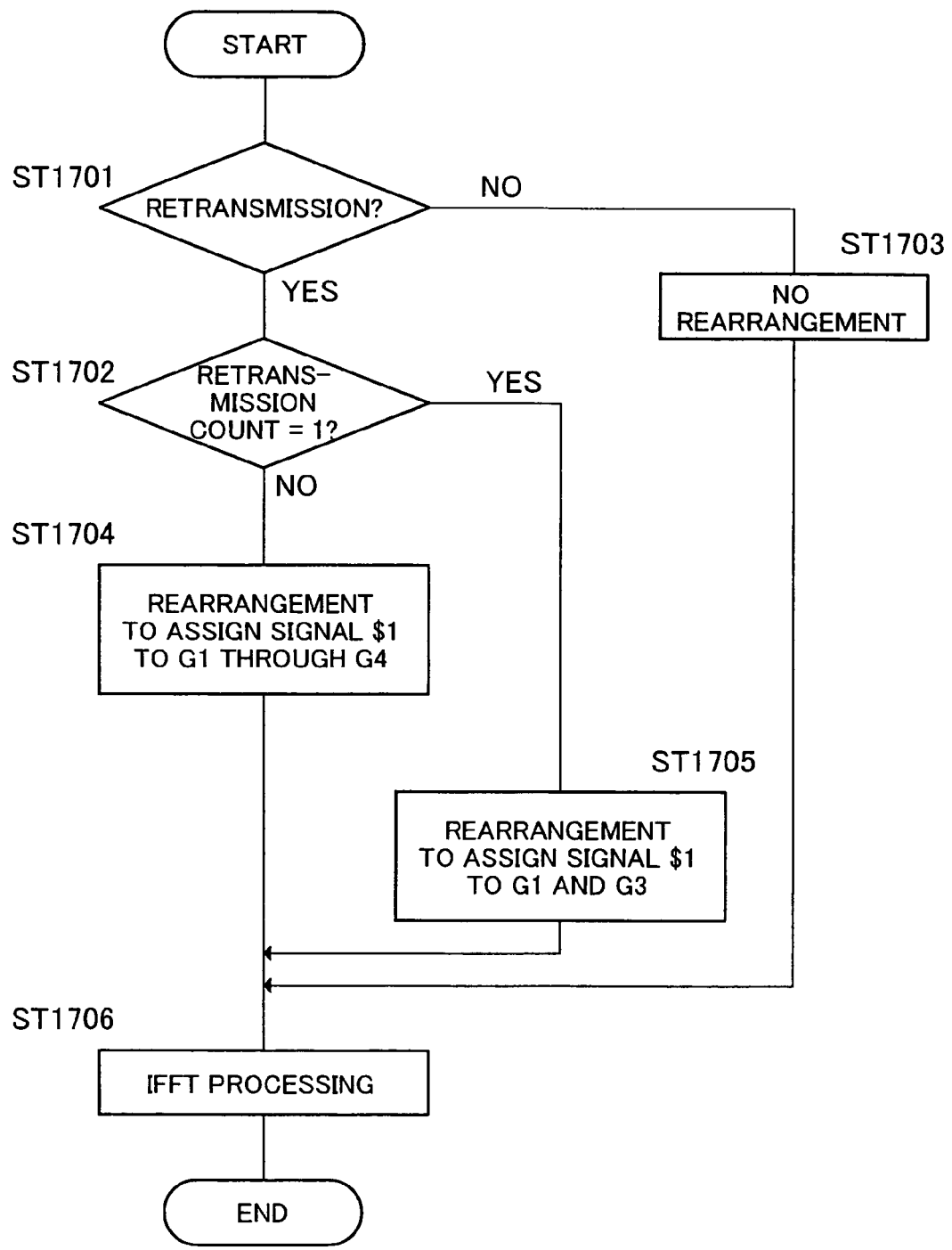
FIG. 17 is a flowchart showing the operation of a transmitting apparatus according to Embodiment 6 of the present invention.
Figure 19:
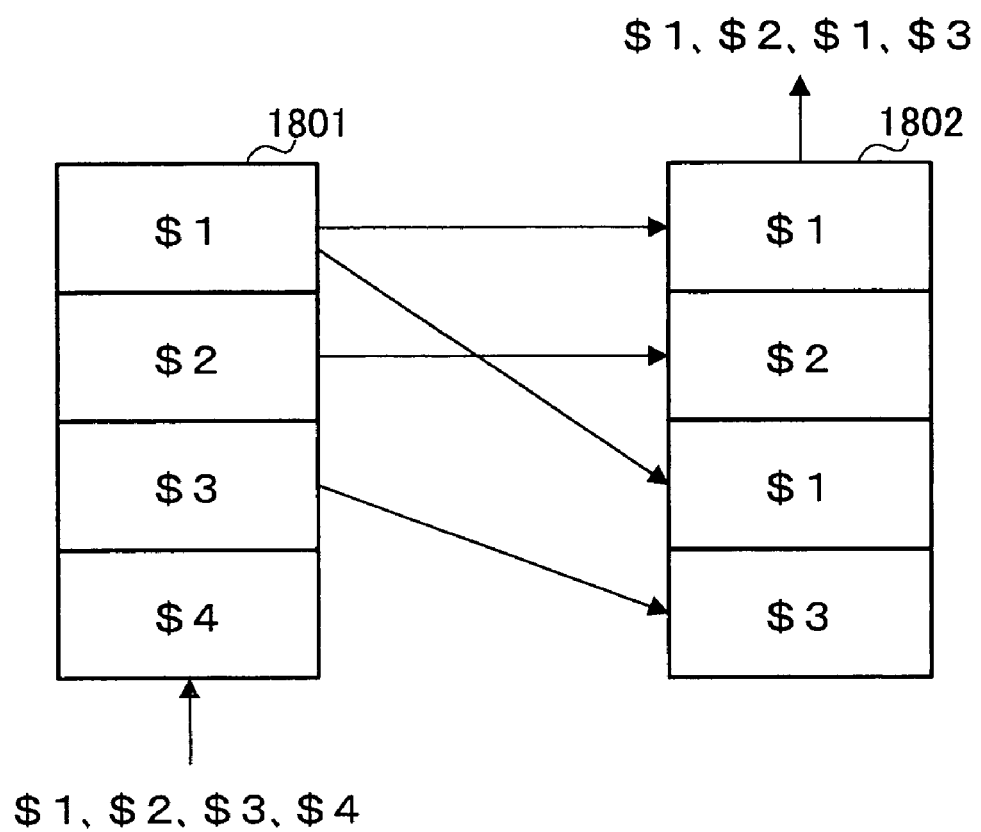
FIG. 19 is a drawing showing transmit signal rearrangement.
Figure 20:
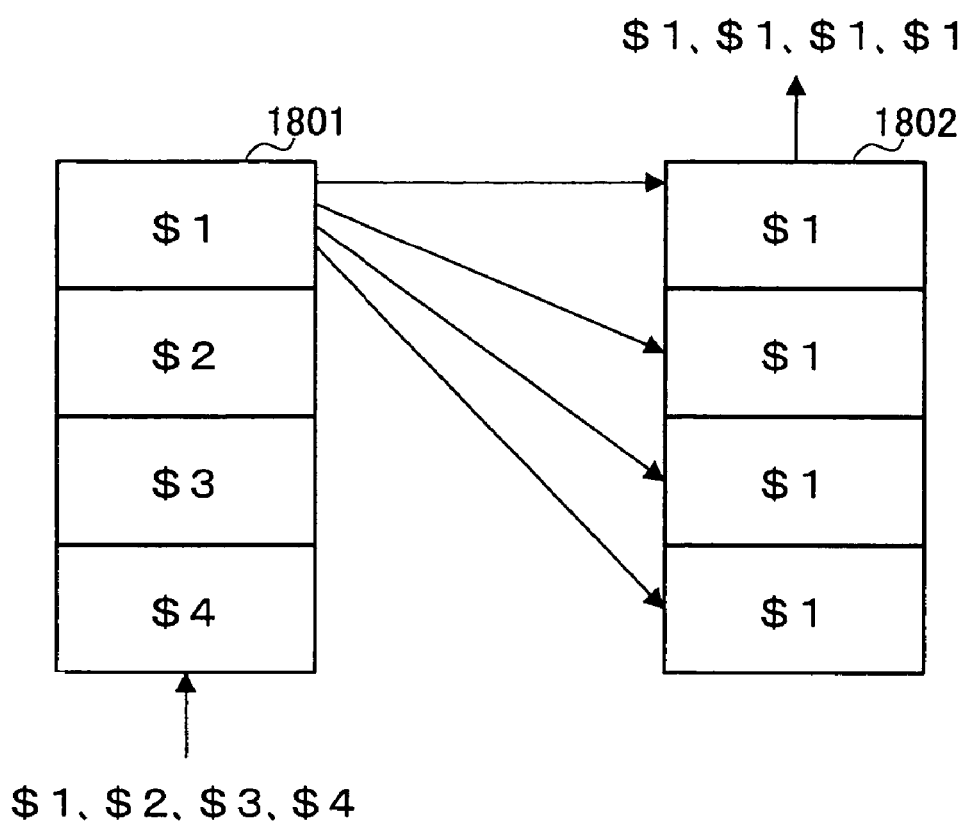
FIG. 20 is a drawing showing transmit signal rearrangement.

The operation of transmitting apparatus 1600 will now be described using FIG. 17 through FIG. 20. FIG. 17 is a flowchart showing the operation of transmitting apparatus 1600, and FIG. 18 through FIG. 20 are drawings showing transmit signal rearrangement methods using S/P conversion section 1603 and P/S conversion section 1604.

First, control section 1601 determines whether an input transmit signal demodulated by a demodulation section (not shown) is a normal non-retransmission signal or a retransmission signal (ST1701), and if the transmit signal is a retransmission signal, determines whether or not this is the first retransmission (ST1702). Control section 1601 then outputs retransmission information comprising information as to whether the signal is a normal signal or a retransmission signal (hereinafter referred to as "signal type information"), information as to the number of retransmissions (hereinafter referred to as "count information"), and information as to which signal the communicating party is requesting to be retransmitted (hereinafter referred to as "request information"), to S/P conversion section 1603 and P/S conversion section 1604.

Figure 18:
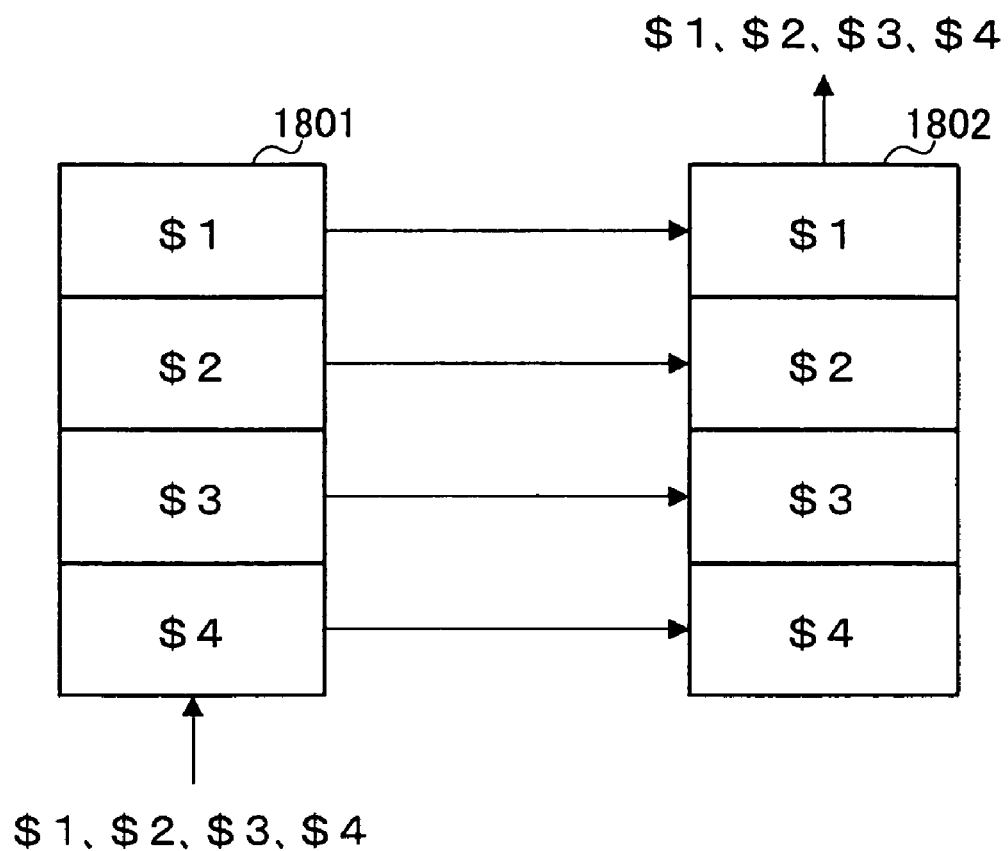
FIG. 18 is a drawing showing transmit signal rearrangement.

In the case of a normal transmission—that is, a transmission that is not a retransmission—a transmit signal that has undergone spreading processing by spreading section 1602 is converted from serial data format data sequence "$1, $2, $3, $4" to parallel data format by S/P conversion section 1603, and stored temporarily in memory 1801, as shown in FIG. 18. Signal $1 through signal $4 are code division multiplexed signals.

As the transmit signals output from S/P conversion section 1603 are in a normal transmission, they are not rearranged by P/S conversion section 1604, and are arranged in memory 1802 in signal $1, $2, $3, $4 order from the top of FIG. 18, then read sequentially from the top of FIG. 18, and converted to serial data format. The transmit signal output from P/S conversion section 1604 is arranged as serial data format data sequence "$1, $2, $3, $4" (ST1703).

On the other hand, in the case of a first retransmission, a transmit signal that has undergone spreading processing by spreading section 1602 is converted from serial data format data sequence "$1, $2, $3, $4" to parallel data format by S/P conversion section 1603, and stored temporarily in memory 1801, as shown in FIG. 19. Then, since, according to signal type information, count information, and request information input from control section 1601, this is a first retransmission and retransmission has been requested for signal $1, signal $1 is read twice from memory 1801 and signals $2 and $3 are read once each, and these signals are output to P/S conversion section 1604.

As shown in FIG. 19, the transmit signals output from S/P conversion section 1603 are arranged in memory 1802 of P/S conversion section 1604 in signal $1, $2, $1, $3 order from the top of FIG. 19, then read sequentially from the top of FIG. 19, and converted to serial data format. The transmit signal output from P/S conversion section 1604 is arranged as serial data format data sequence "$1, $2, $1, $3" (ST1705). In a retransmission, transmission may be performed with only a signal for which there is a retransmission request assigned to subcarriers, but retransmission is not limited to the case where transmission is performed with only a signal for which there is a retransmission request assigned to subcarriers, and transmission may be performed with any signal for which there is no retransmission request transmitted together with a retransmission signal, assigned to different subcarriers.

In the case of a second retransmission, a transmit signal that has undergone spreading processing by spreading section 1602 is converted from serial data format data sequence "$1, $2, $3, $4" to parallel data format by S/P conversion section 1603, and stored temporarily in memory 1801, as shown in FIG. 20. Then, since, according to signal type information, count information, and request information input from control section 1601, this is a second retransmission and retransmission has been requested for signal $1, signal $1 only is read four times from memory 1801 and output to P/S conversion section 1604.

As shown in FIG. 20, the transmit signals output from S/P conversion section 1603 are arranged in memory 1802 of P/S conversion section 1604 in signal $1, $1, $1, $1 order from the top of FIG. 20, then read sequentially from the top of FIG. 20, and converted to serial data format. The transmit signal output from P/S conversion section 1604 is arranged as serial data format data sequence "$1, $1, $1, $1" (ST1704).

The transmit signal then undergoes orthogonal frequency division multiplexing processing such as IFFT processing by IFFT section 1605, and an OFDM-CDMA signal is obtained (ST1706).

The allocation of signals to subcarriers in an OFDM-CDMA signal obtained in this way will now be described using FIG. 21 through FIG. 23.

With an OFDM-CDMA signal, the spreading ratio is made one-fourth of the number of subcarriers, and all the subcarriers are divided into four subcarrier groups. That is to say, an OFDM-CDMA signal is divided into a first group G1 composed of subcarrier #3$m$+1 through subcarrier #4$m$, a second group G2 composed of subcarrier #2$m$+1 through subcarrier #3$m$, a third group G3 composed of subcarrier #$m$+1 through subcarrier #2$m$, and a fourth group G4 composed of subcarrier #1 through subcarrier #$m$, and code division multiplexed signals are arranged distributed among subcarrier groups on a group-by-group basis.

Figure 21:
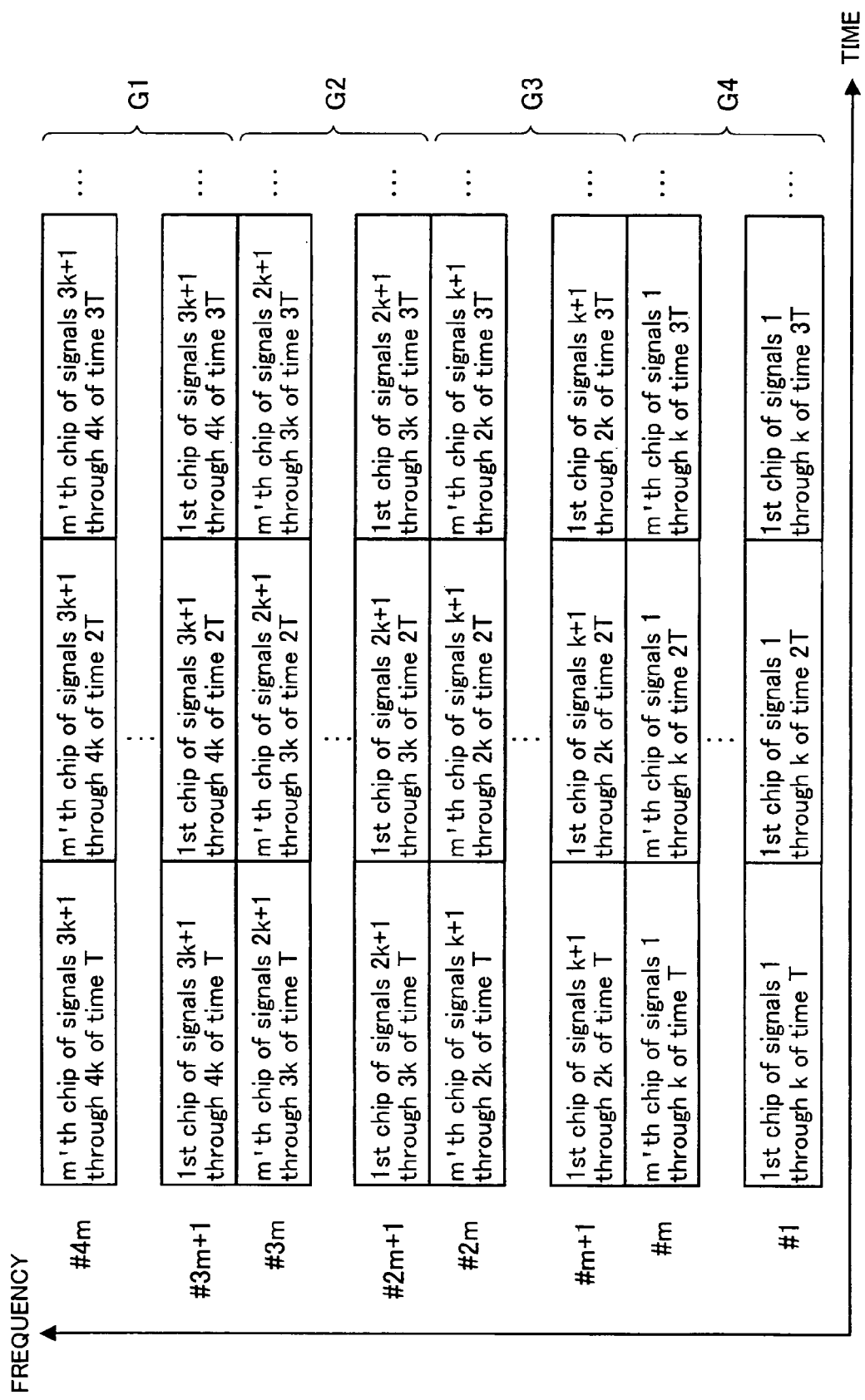
FIG. 21 is a drawing showing signal assignment to subcarriers.

In normal (non-retransmission) transmission, as shown in FIG. 21 signal $1 is arranged distributed among the subcarriers of first group G1, signal $2 is arranged distributed among the subcarriers of second group G2, signal $3 is arranged distributed among the subcarriers of third group G3, and signal $4 is arranged distributed among the subcarriers of fourth group G4.

Figure 22:
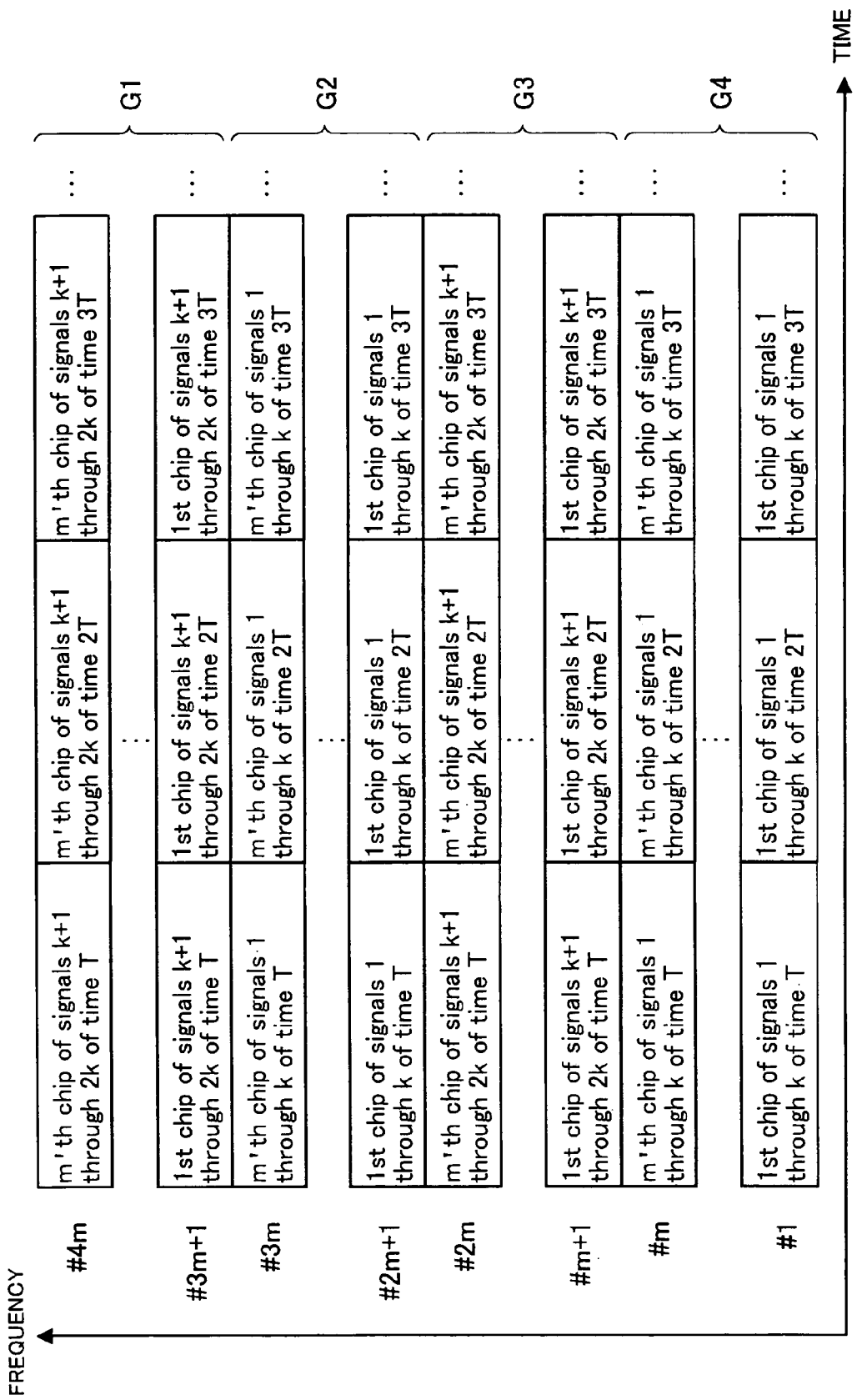
FIG. 22 is a drawing showing signal assignment to subcarriers.

On the other hand, in a first retransmission, as shown in FIG. 22 signal $1 is arranged distributed among the subcarriers of first group G1 and in third group G3 signal $1 is arranged distributed among the subcarriers in the same way as in first group G1, signal $2 is assigned to second group G2, and signal $3 is assigned to fourth group G4. Therefore, in a first retransmission, the number of subcarriers is doubled as compared with a normal transmission by having signal $1 assigned to the subcarriers of third group G3.

Figure 23:
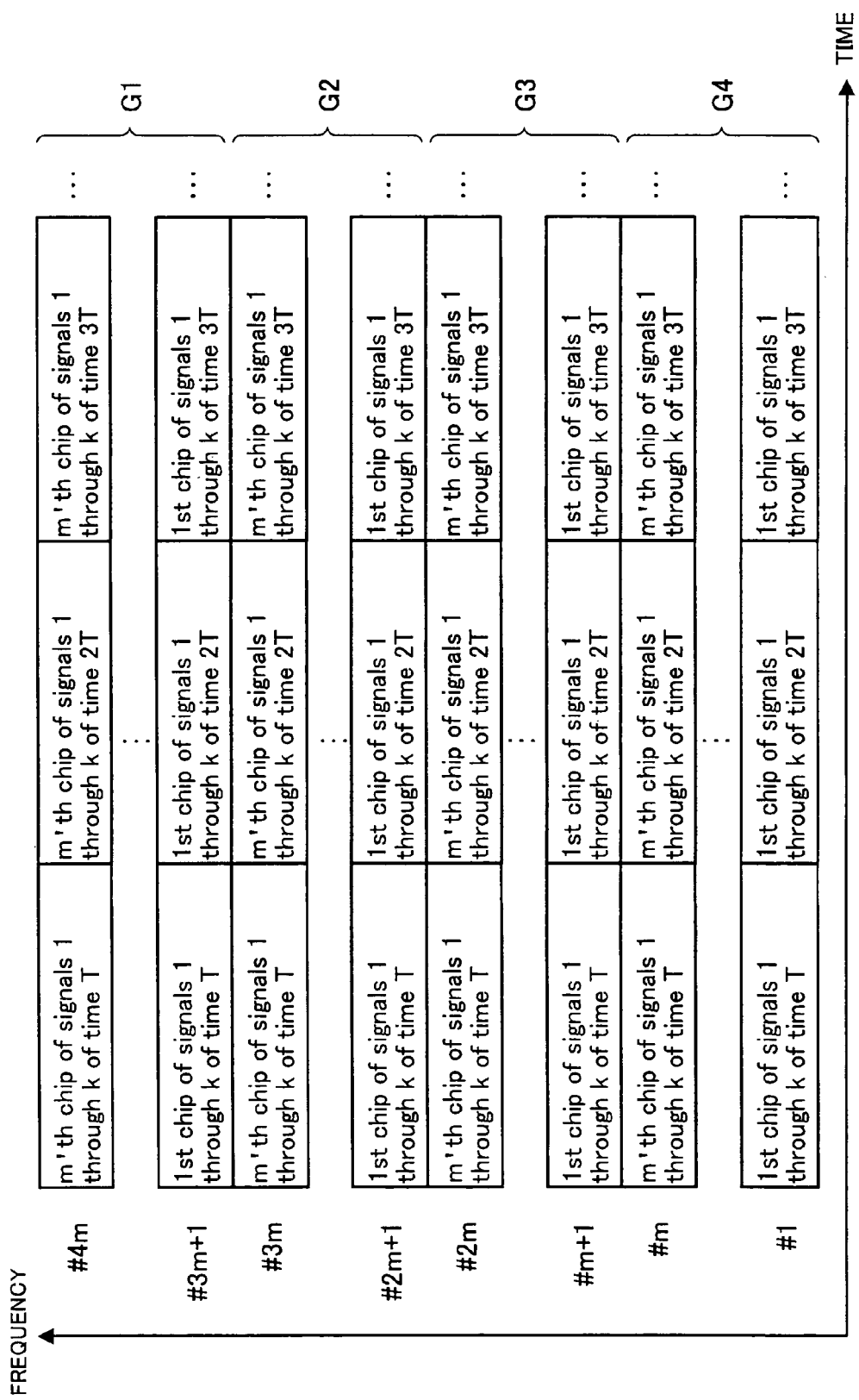
FIG. 23 is a drawing showing signal assignment to subcarriers.

In a second retransmission, as shown in FIG. 23 signal $1 is arranged distributed among the subcarriers of first group G1, and in second group G2, third group G3, and fourth group G4, also, signal $1 is arranged distributed among the subcarriers in the same way as in first group G1. Therefore, in a second retransmission, the number of subcarriers is doubled compared with a first retransmission by having signal $1 assigned to the subcarriers of second group G2 and the subcarriers of fourth group G4.

If the number of subcarriers to which a retransmission signal is assigned is increased as the number of retransmissions increases, a frequency diversity effect can be obtained, and error rate characteristics can be improved. Also, since the number of subcarriers to which a retransmission signal is assigned increases by an integral multiple of 2 each time as the number of retransmissions increases, in clock frequency division the frequency can be halved each time, simplifying clock generation, and data need only be added two at a time when receiving, simplifying received signal synthesis.

Thus, according to Embodiment 6, an S/P conversion section generates a retransmission signal based on retransmission information received from a control section, a P/S conversion section performs rearrangement of a transmit signal containing the generated retransmission signal, and the transmit signal undergoes orthogonal frequency division multiplexing by an IFFT section, so that the number of subcarriers to which a retransmission signal is assigned increases as the number of retransmissions increases, and it is possible to prevent an increase in transmission delay due to an excessive increase in the number of retransmissions.

Embodiment 7

Figure 24:
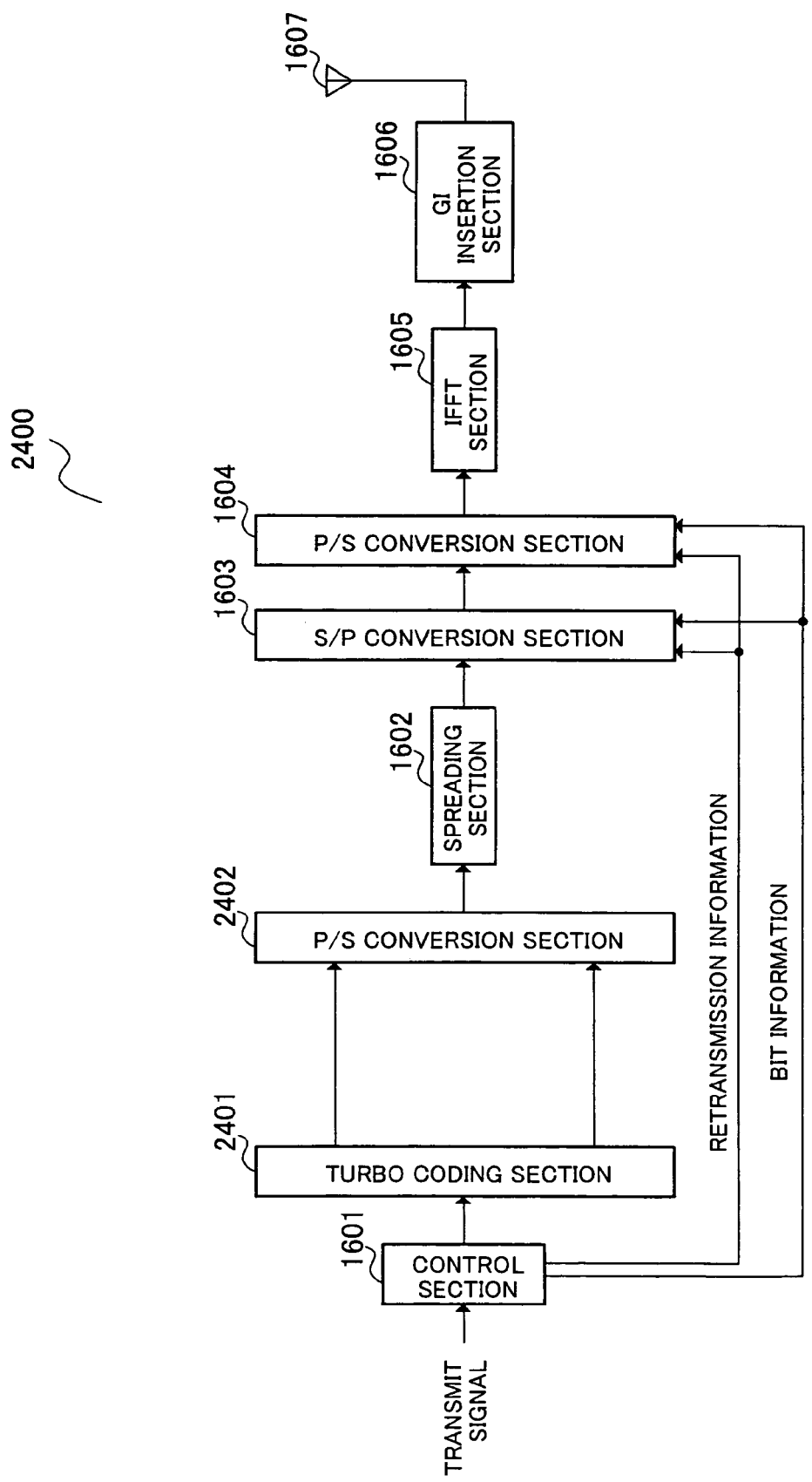
FIG. 24 is a block diagram showing the configuration of a transmitting apparatus according to Embodiment 7 of the present invention.

FIG. 24 is a drawing showing the configuration of a transmitting apparatus 2400 according to Embodiment 7 of the present invention. A feature of this embodiment is that systematic bit data and parity bit data are assigned to subcarriers separately. In this embodiment, the configuration in FIG. 24 differs from that in FIG. 16 in including a turbo coding section 2401 and a parallel/serial (hereinafter referred to as "P/S") conversion section 2402. Parts in FIG. 24 identical to those in FIG. 16 are assigned the same codes as in FIG. 16, and descriptions thereof are omitted.

When turbo code is used as an error correction code, systematic bit data and parity bit data are output, and better quality is required for systematic bit data. Therefore, by making the number of subcarriers to which systematic bit data is assigned greater than the number of subcarriers to which parity bit data is assigned, it is possible to further achieve compatibility between transmission efficiency and the error rate.

Control section 1601 temporarily stores transmit signals, and separates transmit signals into retransmission information and normal information other than retransmission information. Then, when transmission timing is reached, control section 1601 outputs a transmit signal to spreading section 1602, and also outputs retransmission information to S/P conversion section 1603 and P/S conversion section 1604. Retransmission information comprises only signal type information in the case of a normal transmission, but comprises signal type information, count information, and request information in the case of a retransmission. Control section 1601 also controls the transmission timing at which systematic bit data and parity bit data are output, and outputs information as to whether a transmit signal is systematic bit data or parity bit data to S/P conversion section 1603 and P/S conversion section 1604.

Turbo coding section 2401, which is a coding section, outputs part of a transmit signal input from control section 1601 uncoded to P/S conversion section 2402 as systematic bit data, and also performs recursive convolutional coding on the remaining part of the input transmit signal and outputs this part to P/S conversion section 2402 as parity bit data.

P/S conversion section 2402 converts systematic bit data and parity bit data input from turbo coding section 2401 from parallel data format to serial data format, and outputs these data to spreading section 1602. Systematic bit data and parity bit data are allocated to different symbols.

Figure 25:
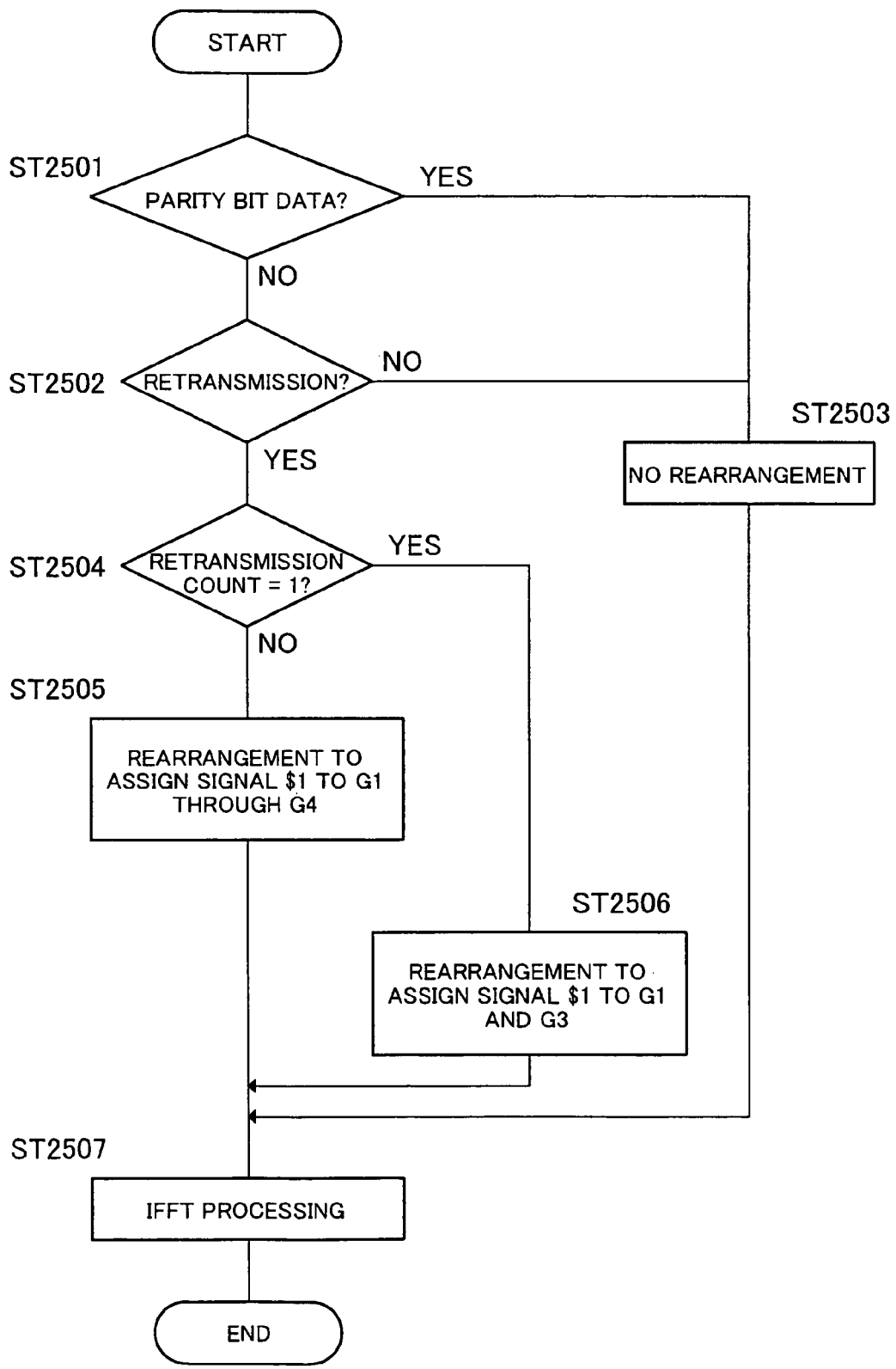
FIG. 25 is a flowchart showing the operation of a transmitting apparatus according to Embodiment 7 of the present invention.

The operation of transmitting apparatus 2400 will now be described using FIG. 18 through FIG. 20 and FIG. 25. FIG. 25 is a flowchart showing the operation of transmitting apparatus 2400.

First, control section 1601 determines whether or not a transmit signal is parity bit data (ST2501) and also determines whether or not this is a retransmission (ST2502), and in the case of a retransmission determines whether or not this is the first retransmission (ST2504) Control section 1601 then outputs information as to whether the transmit signal is systematic bit data or parity bit data (hereinafter referred to as "bit information"), and retransmission information comprising signal type information, count information, and request information, to S/P conversion section 1603 and P/S conversion section 1604.

If the transmit data is parity bit data, a transmit signal that has undergone spreading processing by spreading section 1602 is converted from serial data format parity bit data sequence "$1, $2, $3, $4" to parallel data format by S/P conversion section 1603, and stored temporarily in memory 1801, as shown in FIG. 18.

As the transmit signals output from S/P conversion section 1603 are in a normal transmission, they are not rearranged by P/S conversion section 1604, and are arranged in memory 1802 in parity bit data signal $1, $2, $3, $4 order from the top of FIG. 18, then read sequentially from the top of FIG. 18, and converted to serial data format. The transmit signal output from P/S conversion section 1604 is arranged as serial data format parity bit data sequence "$1, $2, $3, $4" (ST2503).

On the other hand, if the transmit data is systematic bit data and the transmission is a normal transmission (not a retransmission), a transmit signal that has undergone spreading processing by spreading section 1602 is converted from serial data format systematic bit data sequence "$1, $2, $3, $4" to parallel data format by S/P conversion section 1603, and stored temporarily in memory 1801, as shown in FIG. 18.

As the transmit signals output from S/P conversion section 1603 are in a normal transmission, they are not rearranged by P/S conversion section 1604, and are arranged in memory 1802 in systematic bit data signal $1, $2, $3, $4 order from the top of FIG. 18, then read sequentially from the top of FIG. 18, and converted to serial data format. The transmit signal output from P/S conversion section 1604 is arranged as serial data format systematic bit data sequence "$1, $2, $3, $4" (ST2503).

If the transmit data is systematic bit data and the transmission is a first retransmission, a transmit signal that has undergone spreading processing by spreading section 1602 is converted from serial data format parity bit data sequence "$1, $2, $3, $4" to parallel data format by S/P conversion section 1603, and stored temporarily in memory 1801, as shown in FIG. 19. Then, since, according to signal type information, count information, request information, and bit information input from control section 1601, retransmission has been requested for systematic bit data signal $1, systematic bit data signal $1 is read twice from memory 1801 and systematic bit data signals $2 and $3 are read once each, and these signals are output to P/S conversion section 1604.

As shown in FIG. 19, the transmit signals output from S/P conversion section 1603 are arranged in memory 1802 of P/S conversion section 1604 in systematic bit data signal $1, $2, $1, $3 order from the top of FIG. 19, then read sequentially from the top of FIG. 19, and converted to serial data format. The transmit signal output from P/S conversion section 1604 is arranged as serial data format systematic bit data sequence "$1, $2, $1, $3" (ST2506).

If the transmit data is systematic bit data and the transmission is a second retransmission, a transmit signal that has undergone spreading processing by spreading section 1602 is converted from serial data format parity bit data sequence "$1, $2, $3, $4" to parallel data format by S/P conversion section 1603, and stored temporarily in memory 1801, as shown in FIG. 20. Then, since, according to signal type information, count information, request information, and bit information input from control section 1601, this is a second retransmission and retransmission has been requested for systematic bit data signal $1, systematic bit data signal $1 only is read four times from memory 1801 and output to P/S conversion section 1604.

As shown in FIG. 20, the transmit signals output from S/P conversion section 1603 are arranged in memory 1802 of P/S conversion section 1604 as systematic bit data signals $1, $1, $1, $1 from the top of FIG. 20, then read sequentially from the top of FIG. 20, and converted to serial data format. The transmit signal output from P/S conversion section 1604 is arranged as serial data format systematic bit data sequence "$1, $1, $1, $1" (ST2505).

The transmit signal then undergoes orthogonal frequency division multiplexing processing such as IFFT processing by IFFT section 1605, and an OFDM-CDMA signal is obtained (ST2507).

The allocation of signals to subcarriers in an OFDM-CDMA signal obtained in this way will now be described using FIG. 21 through FIG. 23.

When a transmit signal is parity bit data, or when a transmit signal is systematic bit data and transmission is normal (non-retransmission) transmission, as shown in FIG. 21 signal $1 is arranged distributed among the subcarriers of first group G1, signal $2 is arranged distributed among the subcarriers of second group G2, signal $3 is arranged distributed among the subcarriers of third group G3, and signal $4 is arranged distributed among the subcarriers of fourth group G4.

When transmit data is systematic bit data and the transmission is a first retransmission, as shown in FIG. 22 signal $1 is arranged distributed among the subcarriers of first group G1 and in third group G3 signal $1 is arranged distributed among the subcarriers in the same way as in first group G1, signal $2 is assigned to second group G2, and signal $3 is assigned to fourth group G4. Therefore, in a first retransmission, the number of subcarriers is doubled compared with a normal transmission by having signal $1 assigned to the subcarriers of third group G3.

When transmit data is systematic bit data and the transmission is a second retransmission, as shown in FIG. 23 signal $1 is arranged distributed among the subcarriers of first group G1, and in second group G2, third group G3, and fourth group G4, also, signal $1 is arranged distributed among the subcarriers in the same way as in first group G1. Therefore, in a second retransmission, the number of subcarriers is doubled compared with a first retransmission by having signal $1 assigned to the subcarriers of second group G2 and the subcarriers of fourth group G4.

Thus, according to Embodiment 7, in addition to provision of the effects of Embodiment 6 described above, turbo coding of transmit data is performed by a turbo coding section that enables much better error rate characteristics to be obtained that with other error correction methods, enabling error rate characteristics to be significantly improved.

In this embodiment, the number of subcarriers to which parity bit data is assigned does not change, but this is not a limitation, and the number of subcarriers to which parity bit data is assigned may be increased in accordance with the number of retransmissions. Also, in this embodiment, in the case of a retransmission, the number of subcarriers to which systematic bit data is assigned and the number of subcarriers to which parity bit data is assigned are different, but this is not a limitation, and the number of subcarriers to which systematic bit data is assigned and the number of subcarriers to which parity bit data is assigned may be increased by the same number in accordance with the number of retransmissions.

Embodiment 8

Figure 26:
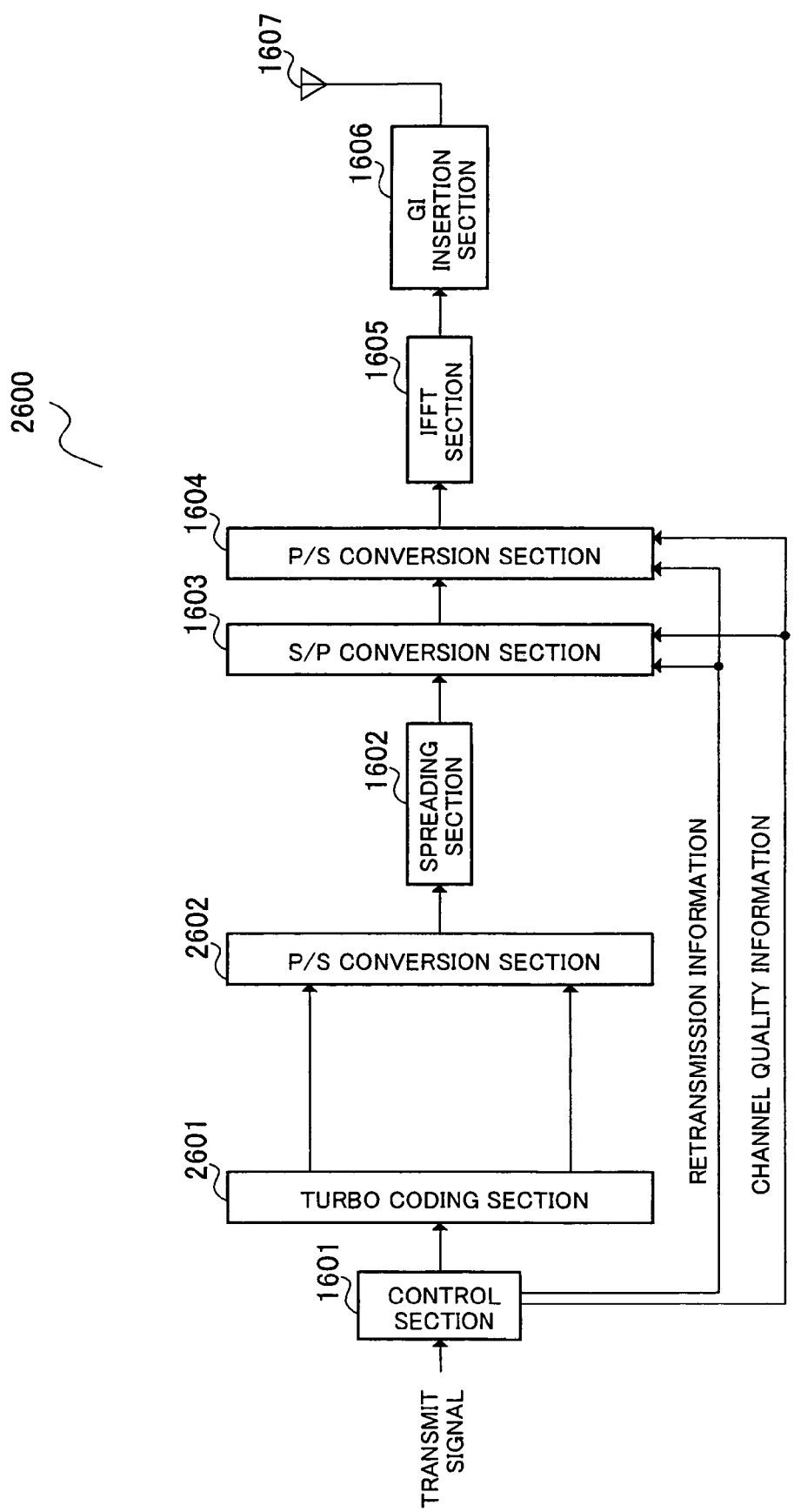
FIG. 26 is a block diagram showing the configuration of a transmitting apparatus according to Embodiment 8 of the present invention.

FIG. 26 is a block diagram showing the configuration of a transmitting apparatus 2600 according to Embodiment 8 of the present invention. A feature of this embodiment is that a retransmission signal is assigned to subcarriers in accordance with channel quality information. Parts in FIG. 26 identical to those in FIG. 16 are assigned the same codes as in FIG. 16, and descriptions thereof are omitted.

Control section 1601 temporarily stores transmit signals modulated by a modulation section (not shown), and separates transmit signals into retransmission information and normal information other than retransmission information. Then, when transmission timing is reached, control section 1601 outputs a transmit signal to spreading section 1602, and also outputs retransmission information to S/P conversion section 1603 and P/S conversion section 1604. Control section 1601 also finds channel quality such as an SIR (signal to interference ratio) from a received signal, and outputs the found channel quality to S/P conversion section 1603 and P/S conversion section 1604 as channel quality information. The method of finding channel quality from a received signal can be employed in the case of a TDD (Time Division Duplex) communication method. Channel quality information may also be detected and transmitted by a communicating party. In this case, signal to interference ratio channel quality information such as an SIR measurement result measured by the communicating party can simply be transmitted by the communicating party.

When retransmission information input from control section 1601 indicates a normal transmission, not a retransmission, S/P conversion section 1603 converts the transmit signal input from spreading section 1602 directly from serial data format to parallel data format, and outputs the resulting signal to P/S conversion section 1604. On the other hand, when retransmission information input from control section 1601 indicates a retransmission, S/P conversion section 1603 generates a number of data to be retransmitted included in retransmission information in accordance with the number of retransmissions, converts the generated data from serial data format to parallel data format, and outputs the converted data to P/S conversion section 1604. At this time, if it is determined from the channel quality information input from control section 1601 that channel quality is extremely poor, S/P conversion section 1603 generates the number of retransmission signals generated in the case of a second retransmission even if the transmission is a first retransmission.

In a first transmission, P/S conversion section 1604 converts a transmit signal input from S/P conversion section 1603 from parallel data format to serial data format, and outputs this signal to IFFT section 1605. In a retransmission, P/S conversion section 1604 performs rearrangement of a transmit signal including retransmission data generated by S/P conversion section 1603 according to retransmission information input from control section 1601, and outputs the rearranged transmit signal to IFFT section 1605.

A turbo coding section 2601 outputs part of a transmit signal input from control section 1601 uncoded to a P/S conversion section 2602 as systematic bit data, and also performs recursive convolutional coding on the remaining part of the input transmit signal and outputs this part to P/S conversion section 2602 as parity bit data.

P/S conversion section 2602 converts systematic bit data and parity bit data input from turbo coding section 2601 from parallel data format to serial data format, and outputs these data to spreading section 1602. Systematic bit data and parity bit data are allocated to different symbols.

Figure 27:
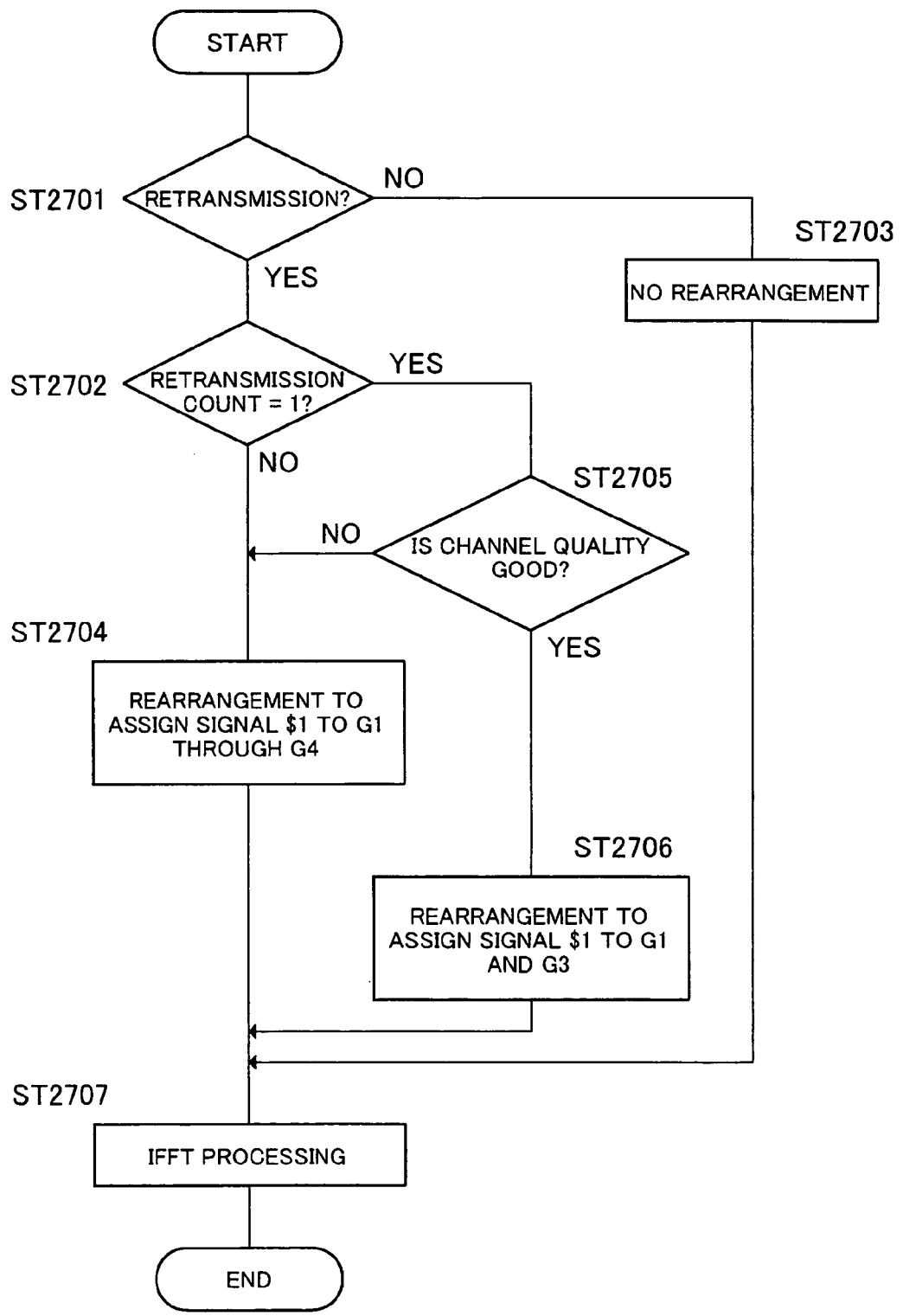
FIG. 27 is a flowchart showing the operation of a transmitting apparatus according to Embodiment 8 of the present invention.

The operation of transmitting apparatus 2600 will now be described using FIG. 18 through FIG. 20 and FIG. 27. FIG. 27 is a flowchart showing the operation of transmitting apparatus 2600.

First, control section 1601 determines whether or not a transmit signal is a retransmission signal (ST2701), and in the case of a retransmission determines whether or not this is the first retransmission (ST2702). Control section 1601 also determines whether or not channel quality is good based on the channel quality found from the received signal. Any channel quality determination method can be used, such as determining whether or not the channel quality is greater than or equal to a threshold value. Control section 1601 then outputs retransmission information comprising signal type information, count information, and request information, and also channel quality information, to S/P conversion section 1603 and P/S conversion section 1604.

In the case of normal (non-retransmission) transmission, a transmit signal that has undergone spreading processing by spreading section 1602 is converted from serial data format systematic bit data sequence "$1, $2, $3, $4" to parallel data format by S/P conversion section 1603, and stored temporarily in memory 1801, as shown in FIG. 18.

As the transmit signals output from S/P conversion section 1603 are in a normal transmission, they are not rearranged by P/S conversion section 1604, and are arranged in memory 1802 in parity bit data signal $1, $2, $3, $4 order from the top of FIG. 18, then read sequentially from the top of FIG. 18, and converted to serial data format. The transmit signal output from P/S conversion section 1604 is arranged as serial data format data sequence "$1, $2, $3, $4" (ST2703).

If the transmission is a first retransmission and channel quality is good, a transmit signal that has undergone spreading processing by spreading section 1602 is converted from serial data format systematic bit data sequence "$1, $2, $3, $4" to parallel data format by S/P conversion section 1603, and stored temporarily in memory 1801, as shown in FIG. 19. Then, since, according to signal type information, count information, request information, and channel quality information input from control section 1601, this is a first retransmission, retransmission has been requested for signal $1, and channel quality is good according to the result of determination of whether or not channel quality is good by control section 1601 (ST2705), signal $1 is read twice from memory 1801 and signals $2 and $3 are read once each, and these signals are output to P/S conversion section 1604.

As shown in FIG. 19, the transmit signals output from S/P conversion section 1603 are arranged in memory 1802 of P/S conversion section 1604 in signal $1, $2, $1, $3 order from the top of FIG. 19, then read sequentially from the top of FIG. 19, and converted to serial data format. The transmit signal output from P/S conversion section 1604 is arranged as serial data format data sequence "$1, $2, $1, $3" (ST2706).

On the other hand, if channel quality is poor even though the transmission is a first retransmission, a transmit signal that has undergone spreading processing by spreading section 1602 is converted from serial data format systematic bit data sequence "$1, $2, $3, $4" to parallel data format by S/P conversion section 1603, and stored temporarily in memory 1801, as shown in FIG. 20. Then, since, according to signal type information, count information, request information, and channel quality information input from control section 1601, this is a first retransmission, retransmission has been requested for signal $1, and channel quality is poor, signal $1 only is read four times from memory 1801 and output to P/S conversion section 1604.

As shown in FIG. 20, the transmit signals output from S/P conversion section 1603 are arranged in memory 1802 of P/S conversion section 1604 in signal $1, $1, $1, $1 order from the top of FIG. 20, then read sequentially from the top of FIG. 20, and converted to serial data format. The transmit signal output from P/S conversion section 1604 is arranged as serial data format data sequence "$1, $1, $1, $1" (ST2704).

In the case of a second retransmission, a transmit signal that has undergone spreading processing by spreading section 1602 is converted from serial data format systematic bit data sequence "$1, $2, $3, $4" to parallel data format by S/P conversion section 1603, and stored temporarily in memory 1801, as shown in FIG. 20. Then, since, according to signal type information, count information, and request information input from control section 1601, this is a second retransmission and retransmission has been requested for signal $1, signal $1 only is read four times from memory 1801 and output to P/S conversion section 1604.

As shown in FIG. 20, the transmit signals output from S/P conversion section 1603 are arranged in memory 1802 of P/S conversion section 1604 in signal $1, $1, $1, $1 order from the top of FIG. 20, then read sequentially from the top of FIG. 20, and converted to serial data format. The transmit signal output from P/S conversion section 1604 is arranged as serial data format systematic bit data sequence "$1, $1, $1, $1" (ST2704).

The transmit signal then undergoes orthogonal frequency division multiplexing processing such as IFFT processing by IFFT section 1605, and an OFDM-CDMA signal is obtained (ST2707).

The allocation of signals to subcarriers in an OFDM-CDMA signal obtained in this way will now be described using FIG. 21 through FIG. 23.

In normal transmission in which a transmit signal is not a retransmission signal, as shown in FIG. 21 signal $1 is arranged distributed among the subcarriers of first group G1, signal $2 is arranged distributed among the subcarriers of second group G2, signal $3 is arranged distributed among the subcarriers of third group G3, and signal $4 is arranged distributed among the subcarriers of fourth group G4.

When the transmission is a first retransmission and channel quality is good, as shown in FIG. 22 signal $1 is arranged distributed among the subcarriers of first group G1 and in third group G3 signal $1 is arranged distributed among the subcarriers in the same way as in first group G1, signal $2 is assigned to second group G2, and signal $3 is assigned to fourth group G4. Therefore, in a first retransmission, the number of subcarriers is doubled compared with a normal transmission by having signal $1 assigned to the subcarriers of third group G3.

When the transmission is a second retransmission or a first retransmission and channel quality is poor, as shown in FIG. 23 signal $1 is arranged distributed among the subcarriers of first group G1, and in second group G2, third group G3, and fourth group G4, also, signal $1 is arranged distributed among the subcarriers in the same way as in first group G1. Therefore, in a second retransmission, the number of subcarriers is doubled compared with a normal transmission by having signal $1 assigned to the subcarriers of second group G2 and the subcarriers of fourth group G4.

Thus, according to Embodiment 8, in addition to provision of the effects of Embodiment 6 described above, an S/P conversion section and P/S conversion section arrange a retransmission signal so as to be assigned to subcarriers with channel quality also taken into consideration, enabling error rate characteristics to be improved dependably when channel quality is poor.

Embodiment 9

Figure 28:
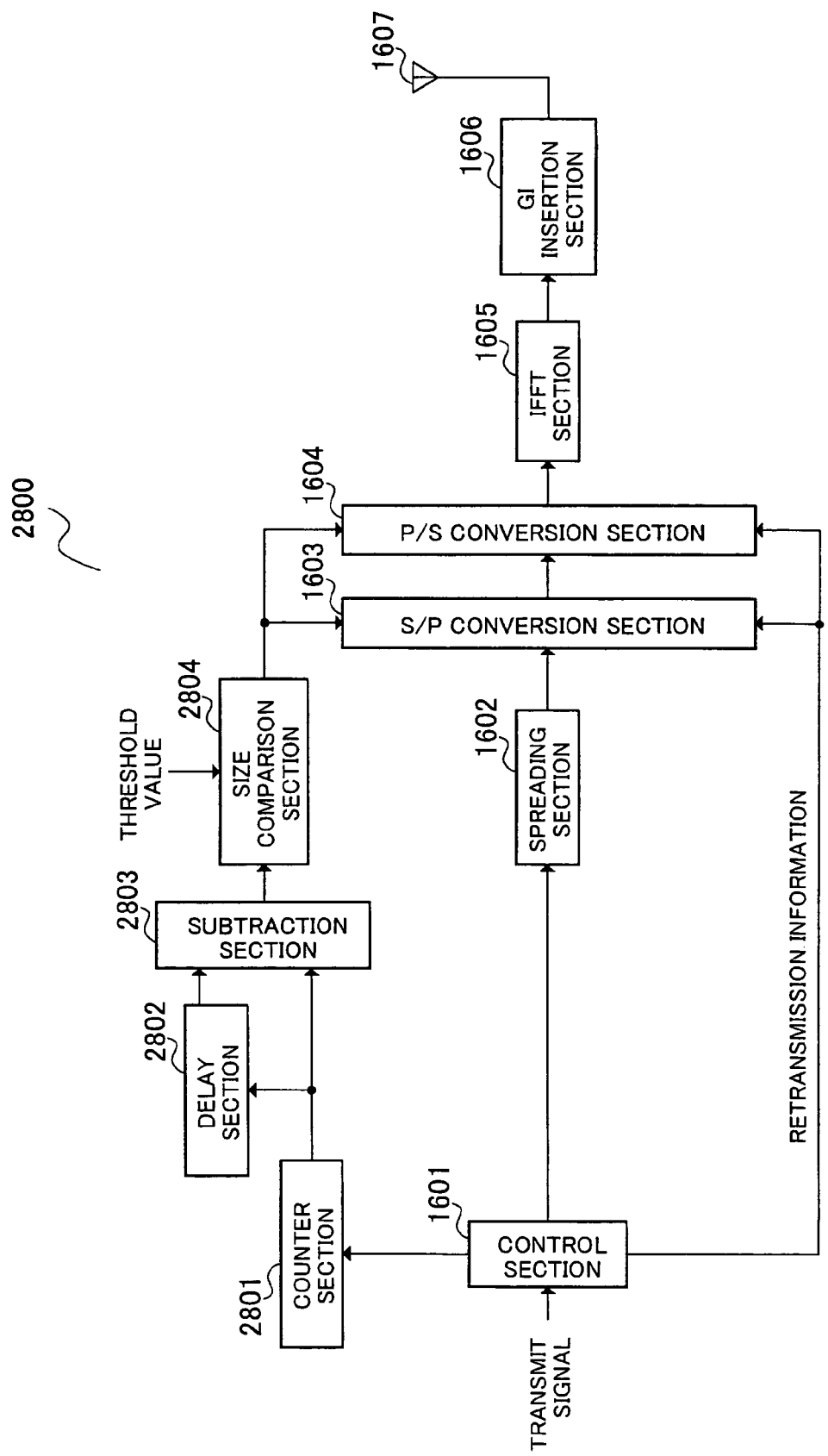
FIG. 28 is a block diagram showing the configuration of a transmitting apparatus according to Embodiment 9 of the present invention.

FIG. 28 is a drawing showing the configuration of a transmitting apparatus 2800 according to Embodiment 9 of the present invention. A feature of this embodiment is that the number of subcarriers to which a retransmission signal is assigned is varied also taking the transmission time interval into consideration. In this embodiment, the configuration in FIG. 28 differs from that in FIG. 16 in including a counter section 2801, a delay section 2802, a subtraction section 2803, and a size comparison section 2804. Parts in FIG. 28 identical to those in FIG. 16 are assigned the same codes as in FIG. 16, and descriptions thereof are omitted.

When CSMA (Carrier Sense Multiple Access) is used as an access method, as in IEEE802.11, if a channel is congested the time interval between the previous transmission and the present transmission may be very long. In such cases, transmission delay may be extremely long if there is an error in a second or third retransmission. An effective method of preventing this problem is to vary the number of subcarriers to which a retransmission signal is assigned taking the transmission time interval between the previous transmission and the present transmission into consideration. In CSMA, a terminal performs carrier sensing and transmits if the reception level is less than or equal to a threshold value.

Counter section 2801 generates information indicating transmission timing based on transmission timing input from control section 1601, and outputs this generated information to delay section 2802 and subtraction section 2803.

Delay section 2802 delays the information indicating transmission timing input from counter section 2801, and outputs this information to subtraction section 2803.

From the information indicating transmission timing input from counter section 2801 and the transmission timing input from delay section 2802, subtraction section 2803 calculates the difference between the transmission timing of the previous transmission and the transmission timing of the present transmission, and outputs the calculated transmission timing difference to size comparison section 2804 as a transmission time interval.

Size comparison section 2804 compares the transmission time interval input from subtraction section 2803 with a threshold value, and outputs transmission time interval information as to whether or not the transmission time interval is greater than or equal to the threshold value to S/P conversion section 1603 and P/S conversion section 1604.

When the transmission is a normal transmission according to retransmission information input from control section 1601, S/P conversion section 1603 converts a transmit signal input from spreading section 1602 directly from serial data format to parallel data format, and outputs the resulting signal to P/S conversion section 1604. On the other hand, when retransmission information input from control section 1601 indicates a retransmission, S/P conversion section 1603 generates a number of data to be retransmitted included in retransmission information in accordance with the number of retransmissions, converts the generated data from serial data format to parallel data format, and outputs the converted data to P/S conversion section 1604. At this time, if the length of the transmission time interval is greater than or equal to the threshold value according to the transmission time interval information input from size comparison section 2804, S/P conversion section 1603 generates retransmission signals equivalent to the number of subcarriers used for retransmission signal assignment in the case of a second retransmission even if the transmission is a first retransmission.

In a first transmission, P/S conversion section 1604 converts a transmit signal input from S/P conversion section 1603 from parallel data format to serial data format, and outputs this signal to IFFT section 1605. In a retransmission, P/S conversion section 1604 performs rearrangement of a transmit signal including retransmission data generated by S/P conversion section 1603 according to retransmission information input from control section 1601, and outputs the rearranged transmit signal to IFFT section 1605.

Figure 29:
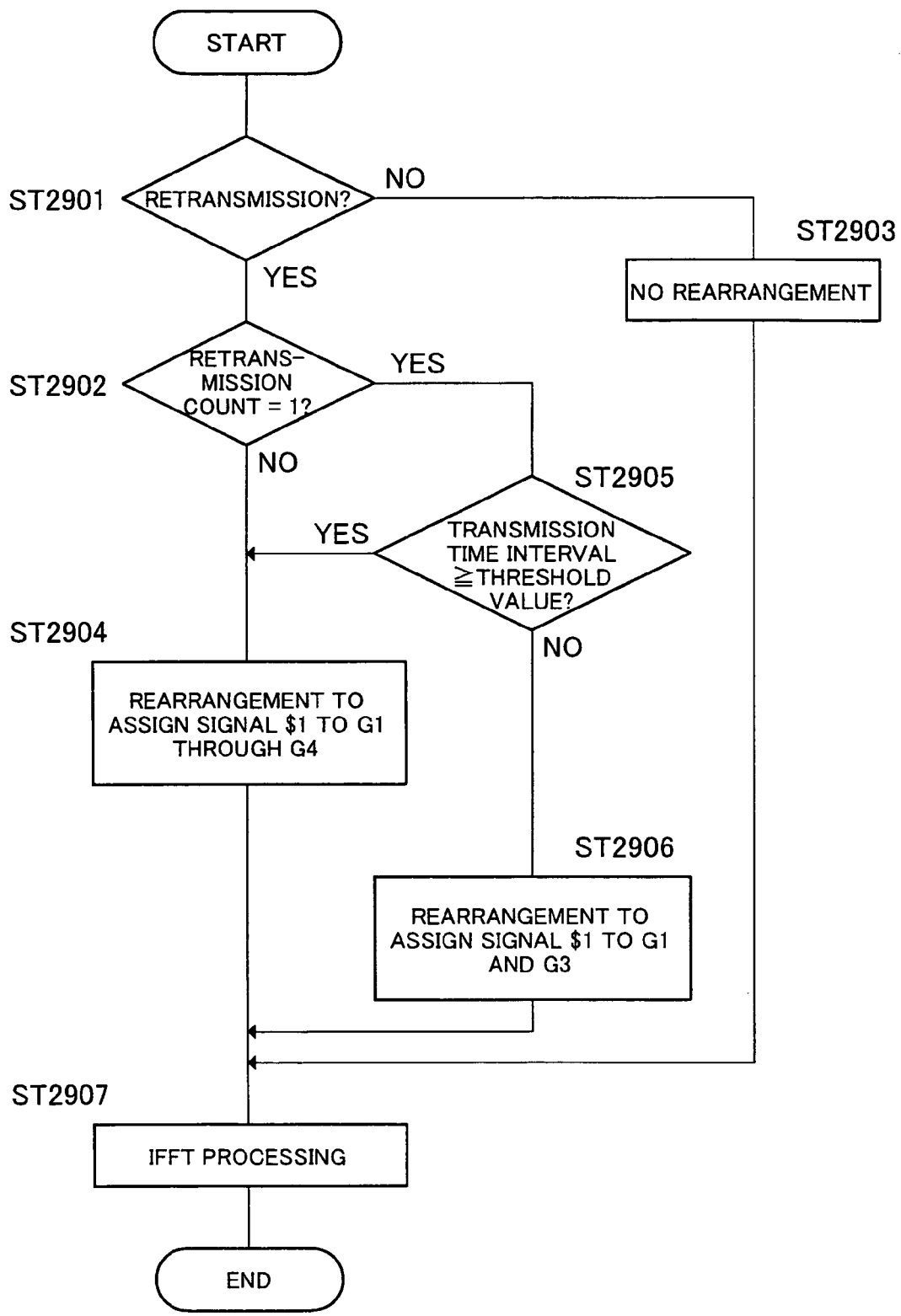
FIG. 29 is a flowchart showing the operation of a transmitting apparatus according to Embodiment 9 of the present invention.

The operation of transmitting apparatus 2800 will now be described using FIG. 18 through FIG. 20 and FIG. 29. FIG. 29 is a flowchart showing the operation of transmitting apparatus 2800.

First, control section 1601 determines whether or not a transmit signal is are transmission signal (ST2901) and if the transmit signal is a retransmission signal, determines whether or not this is the first retransmission (ST2902). Also, subtraction section 2803 outputs the calculated transmission time interval to S/P conversion section 1603 and P/S conversion section 1604.

In the case of a normal transmission—that is, a transmission that is not a retransmission—a transmit signal that has undergone spreading processing by spreading section 1602 is converted from serial data format systematic bit data sequence "$1, $2, $3, $4" to parallel data format by S/P conversion section 1603, and stored temporarily in memory 1801, as shown in FIG. 18.

As the transmit signals output from S/P conversion section 1603 are in a normal transmission, they are not rearranged by P/S conversion section 1604, and are arranged in memory 1802 in signal $1, $2, $3, $4 order from the top of FIG. 18, then read sequentially from the top of FIG. 18, and converted to serial data format. The transmit signal output from P/S conversion section 1604 is arranged as serial data format data sequence "$1, $2, $3, $4" (ST2903).

In the case of a first retransmission, if the transmission time interval input from size comparison section 2804 is less than a threshold value, a transmit signal that has undergone spreading processing by spreading section 1602 is converted from serial data format systematic bit data sequence "$1, $2, $3, $4" to parallel data format by S/P conversion section 1603, and stored temporarily in memory 1801, as shown in FIG. 18. Then, since, based on signal type information, count information, request information, and transmission time interval information input from control section 1601, this is a first retransmission according to the result of determination of whether or not this is a first retransmission by control section 1601 (ST2902), retransmission has been requested for signal $1, and the transmission time interval is less than the threshold value according to the result of determination of whether or not the transmission time interval is greater than or equal to the threshold value by size comparison section 2804 (ST2905), signal $1 is read twice from memory 1801 and signals $2 and $3 are read once each, and these signals are output to P/S conversion section 1604.

As shown in FIG. 19, the transmit signals output from S/P conversion section 1603 are arranged in memory 1802 of P/S conversion section 1604 in signal $1, $2, $1, $3 order from the top of FIG. 19, then read sequentially from the top of FIG. 19, and converted to serial data format. The transmit signal output from P/S conversion section 1604 is arranged as serial data format data sequence "$1, $2, $1, $3" (ST2906).

On the other hand, if the transmission is a first retransmission and the transmission time interval input from size comparison section 2804 is greater than or equal to the threshold value, a transmit signal that has undergone spreading processing by spreading section 1602 is converted from serial data format systematic bit data sequence "$1, $2, $3, $4" to parallel data format by S/P conversion section 1603, and stored temporarily in memory 1801, as shown in FIG. 20. Then, since, according to signal type information, count information, request information, and transmission time interval information input from control section 1601, this is a first retransmission, retransmission has been requested for signal $1, and the transmission time interval is greater than or equal to the threshold value, signal $1 only is read four times from memory 1801 and output to P/S conversion section 1604.

As shown in FIG. 20, the transmit signals output from S/P conversion section 1603 are arranged in memory 1802 of P/S conversion section 1604 in signal $1, $1, $1, $1 order from the top of FIG. 20, then read sequentially from the top of FIG. 20, and converted to serial data format. The transmit signal output from P/S conversion section 1604 is arranged as serial data format data sequence "$1, $1, $1, $1" (ST2904).

In the case of a second retransmission, a transmit signal that has undergone spreading processing by spreading section 1602 is converted from serial data format systematic bit data sequence "$1, $2, $3, $4" to parallel data format by S/P conversion section 1603, and stored temporarily in memory 1801, as shown in FIG. 20. Then, since, according to signal type information, count information, and request information input from control section 1601, retransmission has been requested for signal $1, signal $1 only is read four times from memory 1801 and output to P/S conversion section 1604.

As shown in FIG. 20, the transmit signals output from S/P conversion section 1603 are arranged in memory 1802 of P/S conversion section 1604 in signal $1, $1, $1, $1 order from the top of FIG. 20, then read sequentially from the top of FIG. 20, and converted to serial data format. The transmit signal output from P/S conversion section 1604 is arranged as serial data format systematic bit data sequence "$1, $1, $1, $1" (ST2904).

The transmit signal then undergoes orthogonal frequency division multiplexing processing such as IFFT processing by IFFT section 1605, and an OFDM-CDMA signal is obtained (ST2907).

The allocation of signals to subcarriers in an OFDM-CDMA signal obtained in this way will now be described using FIG. 21 through FIG. 23.

In normal transmission in which a transmit signal is not a retransmission signal, as shown in FIG. 21 signal $1 is arranged distributed among the subcarriers of first group G1, signal $2 is arranged distributed among the subcarriers of second group G2, signal $3 is arranged distributed among the subcarriers of third group G3, and signal $4 is arranged distributed among the subcarriers of fourth group G4.

When the transmission is a first retransmission and the transmission time interval is less than the threshold value, as shown in FIG. 22 signal $1 is arranged distributed among the subcarriers of first group G1 and in third group G3 signal $1 is arranged distributed among the subcarriers in the same way as in first group G1, signal $2 is assigned to second group G2, and signal $3 is assigned to fourth group G4. Therefore, in a first retransmission, the number of subcarriers is doubled compared with a normal transmission by having signal $1 assigned to the subcarriers of third group G3.

When the transmission is a second retransmission or a first retransmission and channel quality is poor, as shown in FIG. 23 signal $1 is arranged distributed among the subcarriers of first group G1, and in second group G2, third group G3, and fourth group G4, also, signal $1 is arranged distributed among the subcarriers in the same way as in first group G1. Therefore, in a second retransmission, the number of subcarriers is doubled compared with a normal transmission by having signal $1 assigned to the subcarriers of second group G2 and the subcarriers of fourth group G4.

Thus, according to Embodiment 9, in addition to provision of the effects of Embodiment 6 described above, an S/P conversion section and P/S conversion section arrange a retransmission signal so as to be assigned to subcarriers with the transmission time interval also taken into consideration, making it possible to prevent transmission delay from becoming extremely long due to numerous retransmissions when the transmission time interval is long.

Embodiment 10

Figure 30:
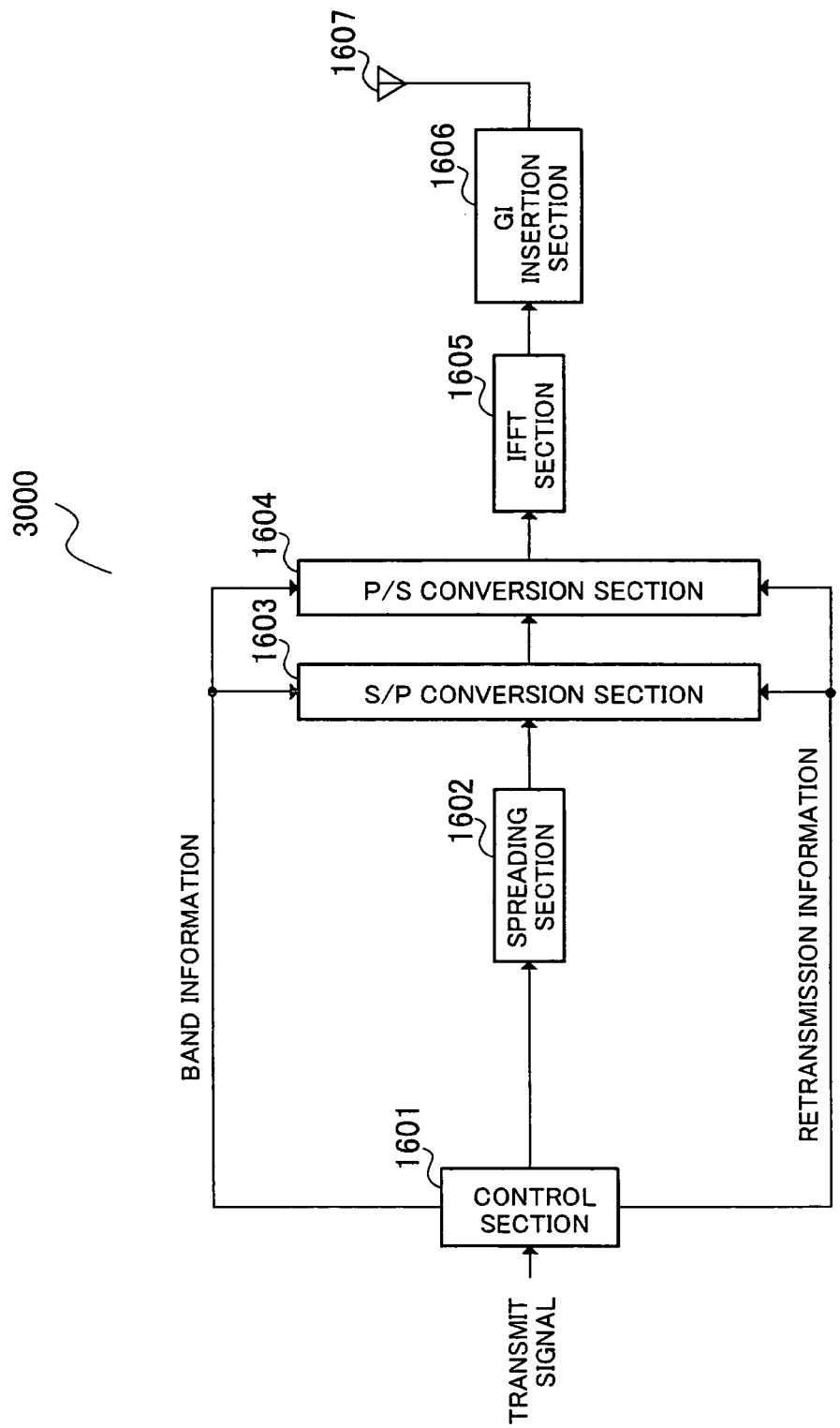
FIG. 30 is a block diagram showing the configuration of a transmitting apparatus according to Embodiment 10 of the present invention.

FIG. 30 is a drawing showing the configuration of a transmitting apparatus 3000 according to Embodiment 10 of the present invention. A feature of this embodiment is that the number of subcarriers to which a retransmission signal is assigned is varied also taking the used band usage situation into consideration. Parts in FIG. 30 identical to those in FIG. 16 are assigned the same codes as in FIG. 16, and descriptions thereof are omitted.

If information on the band usage situation is reported from the communicating party, or the band whose use is permitted is known as a usable bandwidth, control section 1601 can ascertain how much of a margin there is in the remaining band by finding the ratio of the used band currently being used to the band whose use is permitted, and therefore outputs information on the ratio of the used band to the band whose use is permitted (hereinafter referred to as "band information") to S/P conversion section 1603 and P/S conversion section 1604.

When retransmission information input from control section 1601 indicates a normal transmission, S/P conversion section 1603 converts a transmit signal input from spreading section 1602 directly from serial data format to parallel data format, and outputs the resulting signal to P/S conversion section 1604. On the other hand, when retransmission information input from control section 1601 indicates a retransmission, S/P conversion section 1603 generates a number of data to be retransmitted included in retransmission information in accordance with the number of retransmissions, converts the generated data from serial data format to parallel data format, and outputs the converted data to P/S conversion section 1604. At this time, if there is a margin in the band according to the band information input from control section 1601, S/P conversion section 1603 generates retransmission signals equivalent to the number of subcarriers used for retransmission signal assignment in the case of a second retransmission even if the transmission is a first retransmission.

In a first transmission, P/S conversion section 1604 converts a transmit signal input from S/P conversion section 1603 from parallel data format to serial data format, and outputs this signal to IFFT section 1605. In a retransmission, P/S conversion section 1604 performs rearrangement of a transmit signal including retransmission data generated by S/P conversion section 1603 according to retransmission information input from control section 1601, and outputs the rearranged transmit signal to IFFT section 1605.

Figure 31:
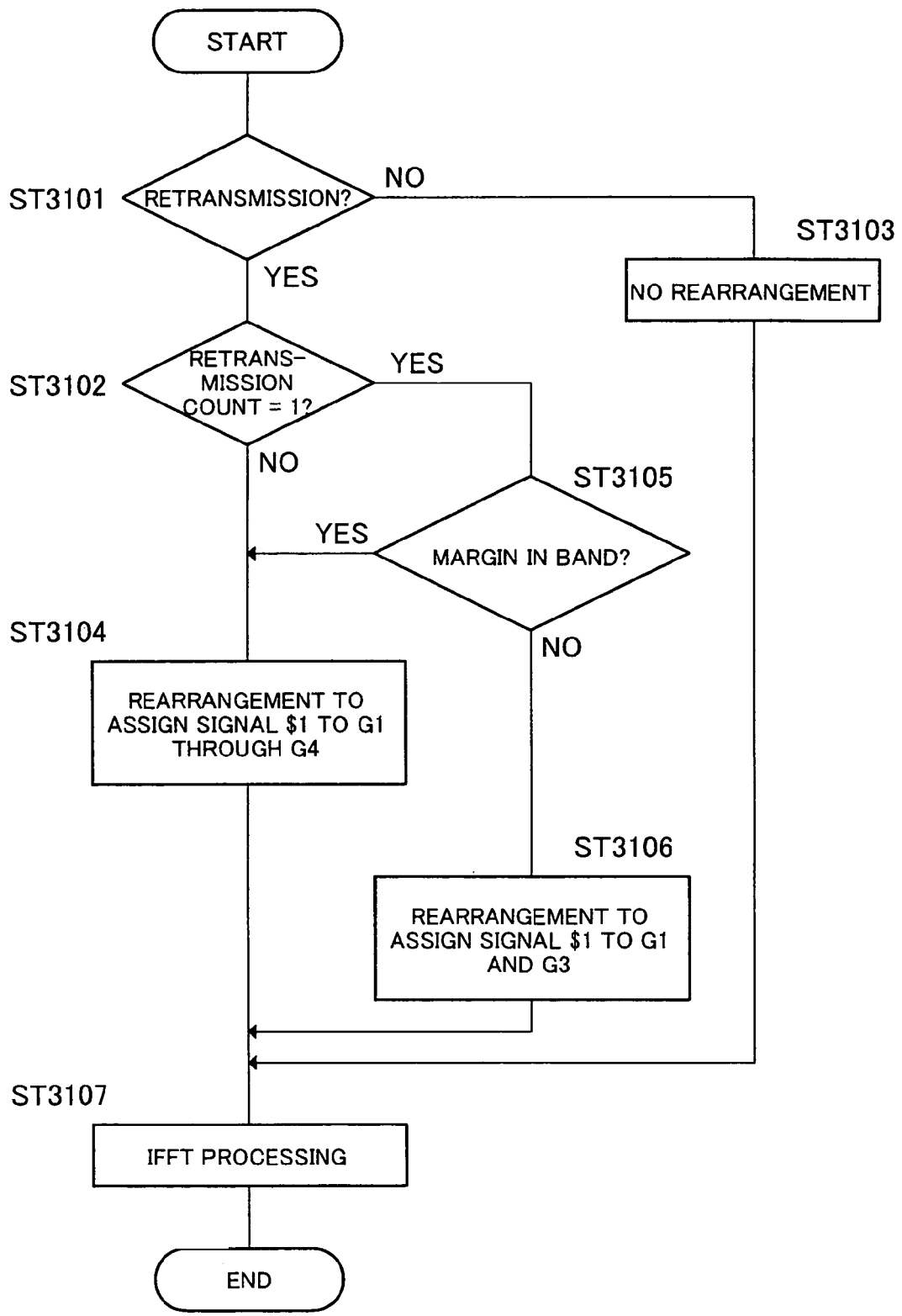
FIG. 31 is a flowchart showing the operation of a transmitting apparatus according to Embodiment 10 of the present invention.

The operation of transmitting apparatus 3000 will now be described using FIG. 18 through FIG. 20 and FIG. 31. FIG. 31 is a flowchart showing the operation of transmitting apparatus 3000.

First, control section 1601 determines whether or not a transmit signal is a retransmission signal (ST3101), and if the transmit signal is a retransmission signal, determines whether or not this is the first retransmission (ST3102). Control section 1601 also determines the size of the ratio of the used band to the band whose use is permitted (ST3105), and outputs the result of this determination to S/P conversion section 1603 and P/S conversion section 1604 as band information.

In the case of a normal transmission—that is, a transmission that is not a retransmission—a transmit signal that has undergone spreading processing by spreading section 1602 is converted from serial data format systematic bit data sequence "$1, $2, $3, $4" to parallel data format by S/P conversion section 1603, and stored temporarily in memory 1801, as shown in FIG. 18.

As the transmit signals output from S/P conversion section 1603 are in a normal transmission, they are not rearranged by P/S conversion section 1604, and are arranged in memory 1802 in signal $1, $2, $3, $4 order from the top of FIG. 18, then read sequentially from the top of FIG. 18, and converted to serial data format. The transmit signal output from P/S conversion section 1604 is arranged as serial data format data sequence "$1, $2, $3, $4" (ST3103).

When the transmission is a first retransmission and there is no margin in the band, a transmit signal that has undergone spreading processing by spreading section 1602 is converted from serial data format systematic bit data sequence "$1, $2, $3, $4" to parallel data format by S/P conversion section 1603, and stored temporarily in memory 1801, as shown in FIG. 19. Then, since, based on signal type information, count information, request information, and band information input from control section 1601, this is a first retransmission, retransmission has been requested for signal $1, and there is no margin in the band, signal $1 is read twice from memory 1801 and signals $2 and $3 are read once each, and these signals are output to P/S conversion section 1604.

As shown in FIG. 19, the transmit signals output from S/P conversion section 1603 are arranged in memory 1802 of P/S conversion section 1604 in signal $1, $2, $1, $3 order from the top of FIG. 19, then read sequentially from the top of FIG. 19, and converted to serial data format. The transmit signal output from P/S conversion section 1604 is arranged as serial data format data sequence "$1, $2, $1, $3" (ST3106).

If the transmission is a first retransmission and there is margin in the band, a transmit signal that has undergone spreading processing by spreading section 1602 is converted from serial data format systematic bit data sequence "$1, $2, $3, $4" to parallel data format by S/P conversion section 1603, and stored temporarily in memory 1801, as shown in FIG. 20. Then, since, according to signal type information, count information, request information, and band information input from control section 1601, this is a first retransmission, retransmission has been requested for signal $1, and there is margin in the band, signal $1 only is read four times from memory 1801 and output to P/S conversion section 1604.

As shown in FIG. 20, the transmit signals output from S/P conversion section 1603 are arranged in memory 1802 of P/S conversion section 1604 in signal $1, $1, $1, $1 order from the top of FIG. 20, then read sequentially from the top of FIG. 20, and converted to serial data format. The transmit signal output from P/S conversion section 1604 is arranged as serial data format data sequence "$1, $1, $1, $1" (ST3104).

In the case of a second retransmission, a transmit signal that has undergone spreading processing by spreading section 1602 is converted from serial data format systematic bit data sequence "$1, $2, $3, $4" to parallel data format by S/P conversion section 1603, and stored temporarily in memory 1801, as shown in FIG. 18. Then, since, according to signal type information, count information, and request information input from control section 1601, this is a second retransmission and retransmission has been requested for signal $1, signal $1 only is read four times from memory 1801 and output to P/S conversion section 1604.

As shown in FIG. 20, the transmit signals output from S/P conversion section 1603 are arranged in memory 1802 of P/S conversion section 1604 in signal $1, $1, $1, $1 order from the top of FIG. 20, then read sequentially from the top of FIG. 20, and converted to serial data format. The transmit signal output from P/S conversion section 1604 is arranged as serial data format systematic bit data sequence "$1, $1, $1, $1" (ST3104).

The transmit signal then undergoes orthogonal frequency division multiplexing processing such as IFFT processing by IFFT section 1605, and an OFDM-CDMA signal is obtained (ST3107).

The allocation of signals to subcarriers in an OFDM-CDMA signal obtained in this way will now be described using FIG. 21 through FIG. 23.

In normal transmission in which a transmit signal is not a retransmission signal, as shown in FIG. 21 signal $1 is arranged distributed among the subcarriers of first group G1, signal $2 is arranged distributed among the subcarriers of second group G2, signal $3 is arranged distributed among the subcarriers of third group G3, and signal $4 is arranged distributed among the subcarriers of fourth group G4.

When the transmission is a first retransmission and there is no margin in the band, as shown in FIG. 22 signal $1 is arranged distributed among the subcarriers of first group G1 and in third group G3 signal $1 is arranged distributed among the subcarriers in the same way as in first group G1, signal $2 is assigned to second group G2, and signal $3 is assigned to fourth group G4. Therefore, in a first retransmission, the number of subcarriers is doubled compared with a normal transmission by having signal $1 assigned to the subcarriers of third group G3.

When the transmission is a second retransmission or a first retransmission and there is margin in the band, as shown in FIG. 23 signal $1 is arranged distributed among the subcarriers of first group G1, and in second group G2, third group G3, and fourth group G4, also, signal $1 is arranged distributed among the subcarriers in the same way as in first group G1. Therefore, in a second retransmission, the number of subcarriers is doubled compared with a normal transmission by having signal $1 assigned to the subcarriers of second group G2 and the subcarriers of fourth group G4.

Thus, according to Embodiment 10, in addition to provision of the effects of Embodiment 6 described above, an S/P conversion section and P/S conversion section arrange a retransmission signal so as to be assigned to subcarriers also taking into consideration whether or not there is margin in the band, making it possible to prevent transmission delay from becoming long without lowering transmission efficiency when there is margin in the band.

Embodiment 11

Figure 32:
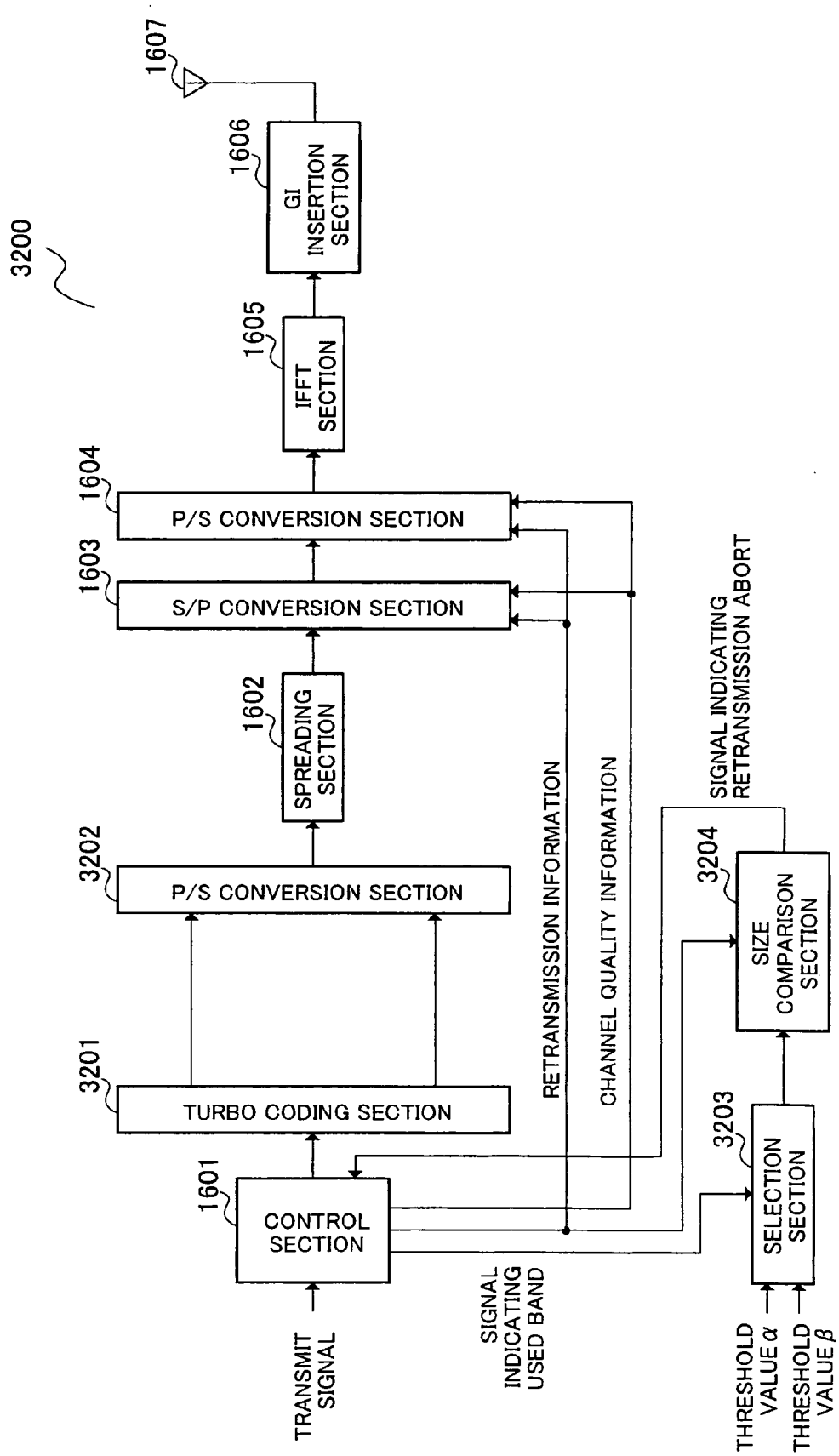
FIG. 32 is a block diagram showing the configuration of a transmitting apparatus according to Embodiment 11 of the present invention.

FIG. 32 is a drawing showing the configuration of a transmitting apparatus 3200 according to Embodiment 11 of the present invention. A feature of this embodiment is that an upper limit is set for the number of retransmissions. In this embodiment, the configuration in FIG. 32 differs from that in FIG. 16 in including a turbo coding section 3201, a selection section 3203, and a size comparison section 3204. Parts in FIG. 32 identical to those in FIG. 16 are assigned the same codes as in FIG. 16, and descriptions thereof are omitted.

Control section 1601, which is a retransmission count control section, temporarily stores transmit signals modulated by a modulation section (not shown) and separates transmit signals into retransmission information and normal information other than retransmission information. Then, when transmission timing is reached, control section 1601 outputs a transmit signal to spreading section 1602, and also outputs retransmission information to S/P conversion section 1603, P/S conversion section 1604, and size comparison section 3204. Control section 1601 also finds channel quality such as an SIR (signal to interference ratio) from a received signal, and outputs the found channel quality to S/P conversion section 1603 and P/S conversion section 1604 as channel quality information. Control section 1601 also outputs band information to selection section 3203. In addition, when a signal that aborts retransmission (hereinafter referred to as "abort signal") is input from size comparison section 3204, control section 1601 halts retransmission signal output.

Turbo coding section 3201 outputs part of a transmit signal input from control section 1601 uncoded to P/S conversion section 3202 as systematic bit data, and also performs recursive convolutional coding on the remaining part of the input transmit signal and outputs this part to P/S conversion section 3202 as parity bit data.

P/S conversion section 3202 converts systematic bit data and parity bit data input from turbo coding section 3201 from parallel data format to serial data format, and outputs these data to spreading section 1602. Systematic bit data and parity bit data converted by P/S conversion section 3202 is made up of all systematic bits or parity bits on a symbol-by-symbol basis.

Based on band information input from control section 1601, selection section 3203 selects a threshold value α or threshold value β and outputs the selected threshold value to size comparison section 3204. That is to say, if the ratio of the present used band to the band whose use is permitted is large, threshold value β (where threshold value α>threshold value β) is selected, and if the ratio of the present used band to the band whose use is permitted is small, threshold value α is selected. As the threshold value is selected in accordance with band information in this way, the upper limit of the number of retransmissions can be varied adaptively according to the band usage situation, and compatibility between overall system throughput and error rate characteristics can be achieved.

Size comparison section 3204 compares the retransmission count based on count information input from control section 1601 with threshold value α or threshold value β input from selection section 3203, and if the retransmission count is greater than or equal to the threshold value, outputs an abort signal to control section 1601. On the other hand, if the retransmission count is less than the threshold value, nothing is output. Except for aborting retransmission, the operation of transmitting apparatus 3200 when the retransmission count reaches a predetermined number according to band information is identical to that shown in FIG. 27, and therefore a description thereof is omitted here.

Thus, according to Embodiment 11, in addition to provision of the effects of Embodiment 6, Embodiment 7, and Embodiment 8 described above, a size comparison section aborts retransmission when the retransmission count is greater than or equal to a threshold value, enabling overall system throughput to be increased.

In this embodiment it is assumed that threshold values selected according to whether or not there is a margin in the band are of two kinds, threshold value α and threshold value β, but this is not a limitation, and selection may be made from among three or more threshold values. Also, in this embodiment it is assumed that a transmit signal is turbo coded, but this is not a limitation, and a transmit signal may be coded by means of a coding method other than turbo coding. Furthermore, in this embodiment transmit signal rearrangement is performed also using channel quality information, but this is not a limitation, and transmit signals may be rearranged using only retransmission information. In addition, in this embodiment it is assumed that a selection section selects a threshold value in accordance with the ratio of the used band to the band whose use is permitted, but this is not a limitation, and any method may be employed, such as selecting a threshold value based simply on the size of the used band.

In Embodiment 1 through Embodiment 5 above a case has been described in which the number of retransmissions is two, but the number of retransmissions is not limited to two, and the number of retransmissions can be made any number.

Also, in Embodiment 1 through Embodiment 5 above it is assumed that three kinds of GI length are set, but these embodiments are not limited to the case where three kinds of GI length are set, and it is possible to set GI lengths of any kind.

Moreover, in Embodiment 1 through Embodiment 5 above it is assumed that the GI length is set to one-eighth, one-fourth, or three-eighths of the effective symbol length according to the number of retransmissions, but this is not a limitation, and it is possible to set any length as the GI length according to the number of retransmissions.

Furthermore, in Embodiment 1 through Embodiment 5 above it is assumed that all subcarriers are divided into four groups, but this is not a limitation, and it is possible to use any subcarrier arrangement.

In addition, in Embodiment 6 through Embodiment 11 above it is assumed that the number of subcarriers to which signals are assigned from a normal transmission to a second transmission is changed, but this is not a limitation, and the number of subcarriers to which retransmission signals are assigned may be increased from a normal transmission to a third transmission.

In Embodiment 6 through Embodiment 11 above it is assumed that increasing the number of assigned subcarriers from a normal transmission to a second retransmission is carried out on a group-by-group basis, but this is not a limitation, and in the case of an OFDM signal, the number of assigned subcarriers may be increased from a normal transmission to a second retransmission on a subcarrier-by-subcarrier basis, without grouping subcarriers.

Also, in Embodiment 6 through Embodiment 11 above it is assumed that a retransmission signal is read a plurality of times from an S/P conversion section, and the number of subcarriers to which a retransmission signal is allocated is increased by performing transmit signal rearrangement by means of a P/S conversion section 1604, but this is not a limitation, and the number of subcarriers to which a retransmission signal is allocated may be increased when orthogonal frequency division multiplexing processing is performed by an IFFT section without performing rearrangement, or the number of subcarriers to which a retransmission signal is allocated may be increased by providing separately an IFFT section that performs orthogonal frequency division multiplexing processing of a retransmission signal and an IFFT section that performs orthogonal frequency division multiplexing processing of a normal signal.

Moreover, in Embodiment 6 through Embodiment 11 above it is assumed that subcarriers are divided into four groups, but this is not a limitation, and any number of groups can be used.

Furthermore, in Embodiment 6 through Embodiment 11 above it is assumed that retransmission signals are newly generated by an S/P conversion section, but this is not a limitation, and a transmit signal may be temporarily stored in memory and a retransmission signal read from memory a number of times in accordance with the number of retransmissions.

A transmitting apparatus described in Embodiment 1 through Embodiment 11 above can be applied to a base station apparatus or a communication terminal apparatus.

As described above, according to the present invention it is possible to prevent an increase in transmission delay due to an excessive increase in the number of retransmissions with almost no lowering of transmission efficiency.

This application is based on Japanese Patent Application No. 2002-333448 filed on Nov. 18, 2002, and Japanese Patent Application No. 2002-355079 filed on Dec. 6, 2002, the entire content of which is expressly incorporated by reference herein.

INDUSTRIAL APPLICABILITY

The present invention is suitable for use in a transmitting apparatus and transmitting method that use a multicarrier modulation method such as OFDM (Orthogonal Frequency Division Multiplexing).

The invention claimed is:

1. A transmitting apparatus comprising:
   a coding section that encodes a transmit signal and outputs systematic bit data and parity bit data;
   a spreading section that performs spreading processing of the systematic bit data and the parity bit data, with a spreading ratio of "1";
   a multiplexing section that code-multiplexes the systematic bit data and the parity bit data subjected to spreading processing in said spreading section, with a code multiplexing number of "1";
   an insertion section that inserts a first guard interval in the systematic bit data code-multiplexed in said multiplexing section and inserts a second guard interval in the parity bit data code-multiplexed in said multiplexing section; and
   a control section that sets a length of the first guard interval longer than a length of the second guard interval and lengthens the length of the first guard interval in accordance with an increase in a number of retransmissions of the systematic bit data and the parity bit data.

2. The transmitting apparatus according to claim 1, further comprising an allocation section that allocates the systematic bit data and the parity bit data to different symbols.

3. The transmitting apparatus according to claim 1, wherein said control section sets the length of the first guard interval and the length of the second guard interval according to delay distribution information.

4. The transmitting apparatus according to claim 3, wherein said delay distribution information is transmitted from a communicating party.

5. The transmitting apparatus according to claim 3, further comprising a detection section that detects said delay distribution information from a received signal.

6. The transmitting apparatus according to claim 1, wherein said control section sets the length of the first guard interval and the length of the second guard interval according to a transmission time interval.

7. The transmitting apparatus according to claim 1, wherein said control section sets the length of the first guard interval and the length of the second guard interval according to a used band.

8. The transmitting apparatus according to claim 7, wherein said control section makes the length of the first guard interval and the length of the second guard interval longer proportion as a ratio of said used band to a band whose use is permitted is smaller.

9. The transmitting apparatus according to claim 1, wherein said control section makes a length of the first guard interval and a length of the second guard interval upon retransmission of the systematic bit data and the parity bit data, an integral multiple of a length of the first guard interval and a length of the second guard interval upon first transmission of the systematic bit data and the parity bit data.

10. A base station apparatus comprising a transmitting apparatus according to claim 1.

11. A communication terminal apparatus comprising a transmitting apparatus according to claim 1.

12. A guard interval setting method comprising:
a step of encoding a transmit signal and outputting systematic bit data and parity bit data;
a step of performing spreading processing of the systematic bit data and the and bit data outputted, using a spreader, with a spreading ratio of "1";
a step of code-multiplexing the systematic bit data and the pant bit data subjected to spreading processing, using a multiplexer, with a code multiplexing number of "1";
a step of inserting a first guard interval in the code-multiplexed systematic bit data and inserting a second guard interval in the code-multiplexed parity bit data; and
a step of setting a length of the first guard interval longer than a length of the second guard interval and lengthening the length of the first guard interval, in a control section, in accordance with an increase in a number of retransmissions of the systematic bit data and the parity bit data.

* * * * *